United States Patent [19]

Leyden et al.

[11] Patent Number: 5,143,663
[45] Date of Patent: Sep. 1, 1992

[54] STEREOLITHOGRAPHY METHOD AND APPARATUS

[75] Inventors: Richard N. Leyden, Topanga; Thomas A. Almouist, San Gabriel; Mark A. Lewis, Valencia; Hop D. Nguyen, Little Rock, all of Calif.

[73] Assignee: 3D Systems, Inc., Valencia, Calif.

[21] Appl. No.: 365,444

[22] Filed: Jun. 12, 1989

[51] Int. Cl.$^5$ .................. B29C 35/08; B29C 41/02
[52] U.S. Cl. .................................. 264/22; 34/4;
34/9; 34/12; 34/33; 34/37; 34/149; 34/164;
34/179; 34/180; 34/189; 34/236; 118/57;
118/423; 118/429; 118/620; 134/1; 134/12;
134/31; 134/32; 134/61; 134/63; 134/82;
134/83; 134/137; 134/184; 134/186; 134/195;
156/273.5; 156/275.5; 156/307.1; 156/379.6;
264/23; 264/69; 264/232; 264/233; 264/308;
264/340; 425/174.2; 425/174.4; 425/404;
425/445
[58] Field of Search ............ 264/22, 23, 69, 232,
264/233, 236, 255, 298, 308, 340, 344, 347;
425/174, 174.2, 174.4, 404, 445; 156/273.3,
273.5, 275.5, 307.1, 379.6; 427/53.1, 54.1, 57,
335, 346; 118/57, 402, 423, 425, 429, 620;
364/468, 474.05, 474.24, 476; 365/107, 119,
120, 127; 34/4, 9, 12, 22, 33, 36, 37, 69, 148,
149, 164, 179, 180, 189, 236; 134/1, 12, 31, 32,
61, 63, 82, 83, 137, 184, 186, 195

[56] References Cited

U.S. PATENT DOCUMENTS

| 2,856,638 | 10/1958 | Schulken, Jr. et al. | 264/232 X |
| 3,723,120 | 3/1973 | Hummel | 430/327 |
| 4,575,330 | 3/1986 | Hull | 425/174.4 |

FOREIGN PATENT DOCUMENTS

| 39-29211 | 12/1964 | Japan | 264/232 |
| 60-175031 | 9/1985 | Japan | 264/233 |

Primary Examiner—Leo B. Tentoni
Attorney, Agent, or Firm—Lyon & Lyon

[57] ABSTRACT

An improved stereolithographic apparatus and method is described. In one embodiment, the improvement includes immersing at least a portion of a part in a volume of a liquid solvent in a vapor degreaser while subjecting the portion to ultrasonic agitation to substantially remove excess resin. Several examples of solvents are provided, including ethanol, and Freon TMS. In a second embodiment, the improvement includes building the part on a layer of liquid resin supported by a volume of a dense, immiscible, and UV transparent intermediate liquid, and integratably immersing at least a portion of the built part in the intermediate liquid, and then either subjecting the immersed portion to ultrasonic agitation to substantially remove excess resin, or subjecting the immersed portion to UV light. Several examples of intermediate liquids are provided, including perfluorinated fluids, such as Fluorinert FC-40, and water-based salt solutions, such as solutions of magnesium sulfate or sodium chloride in water.

39 Claims, 14 Drawing Sheets

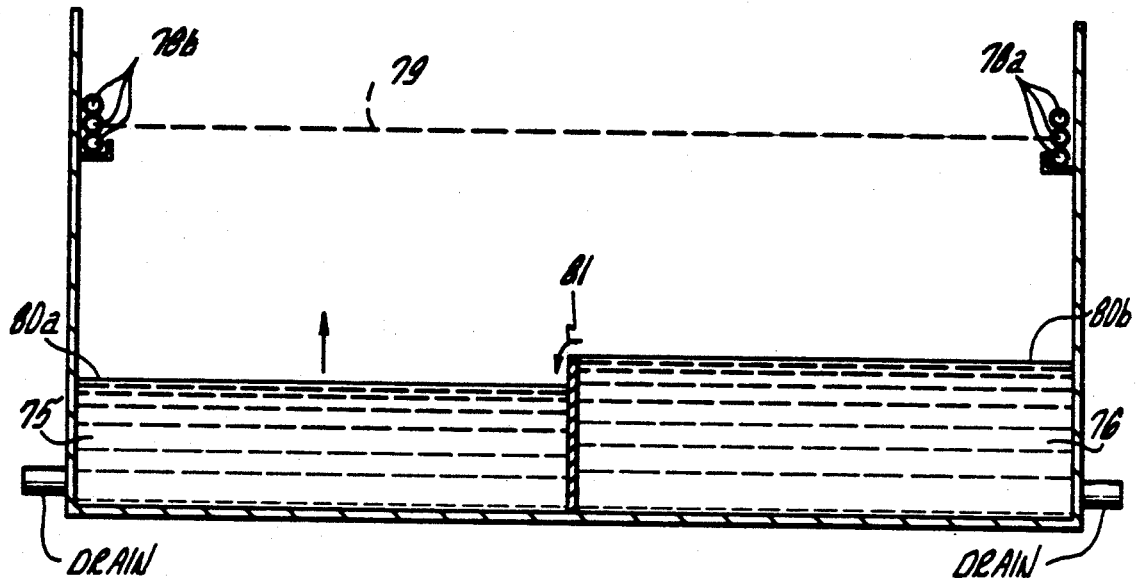
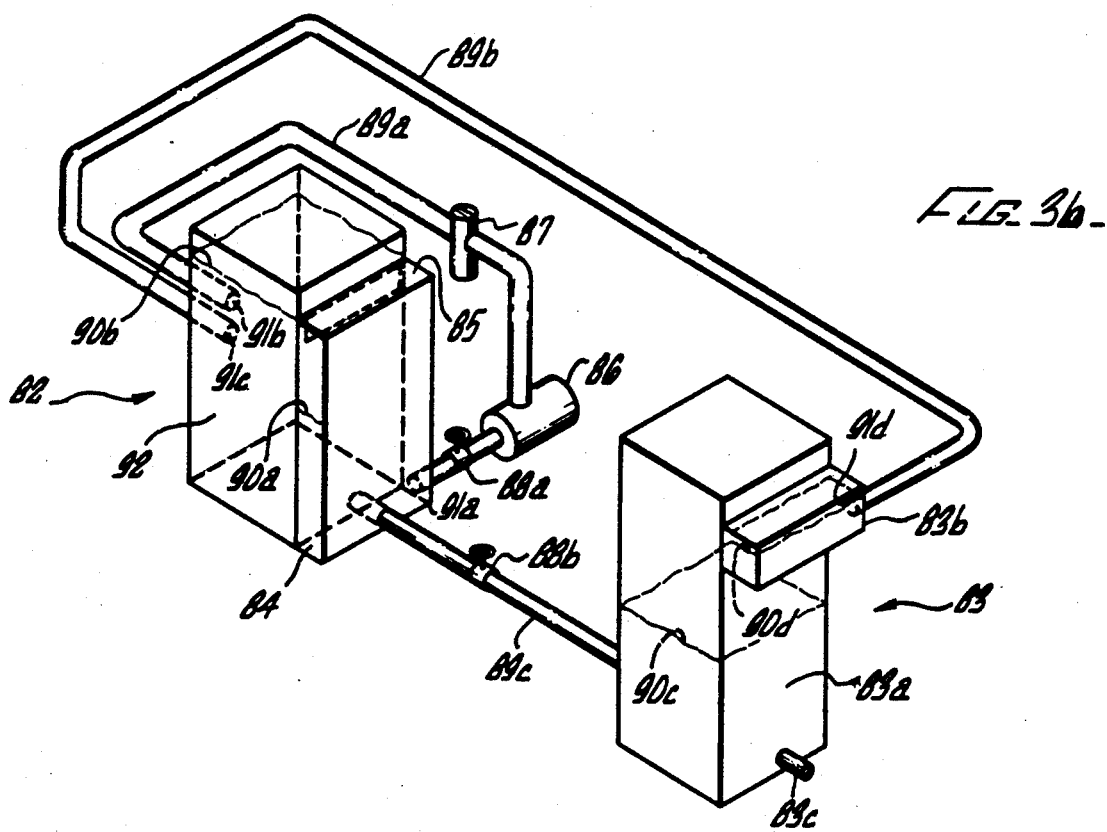

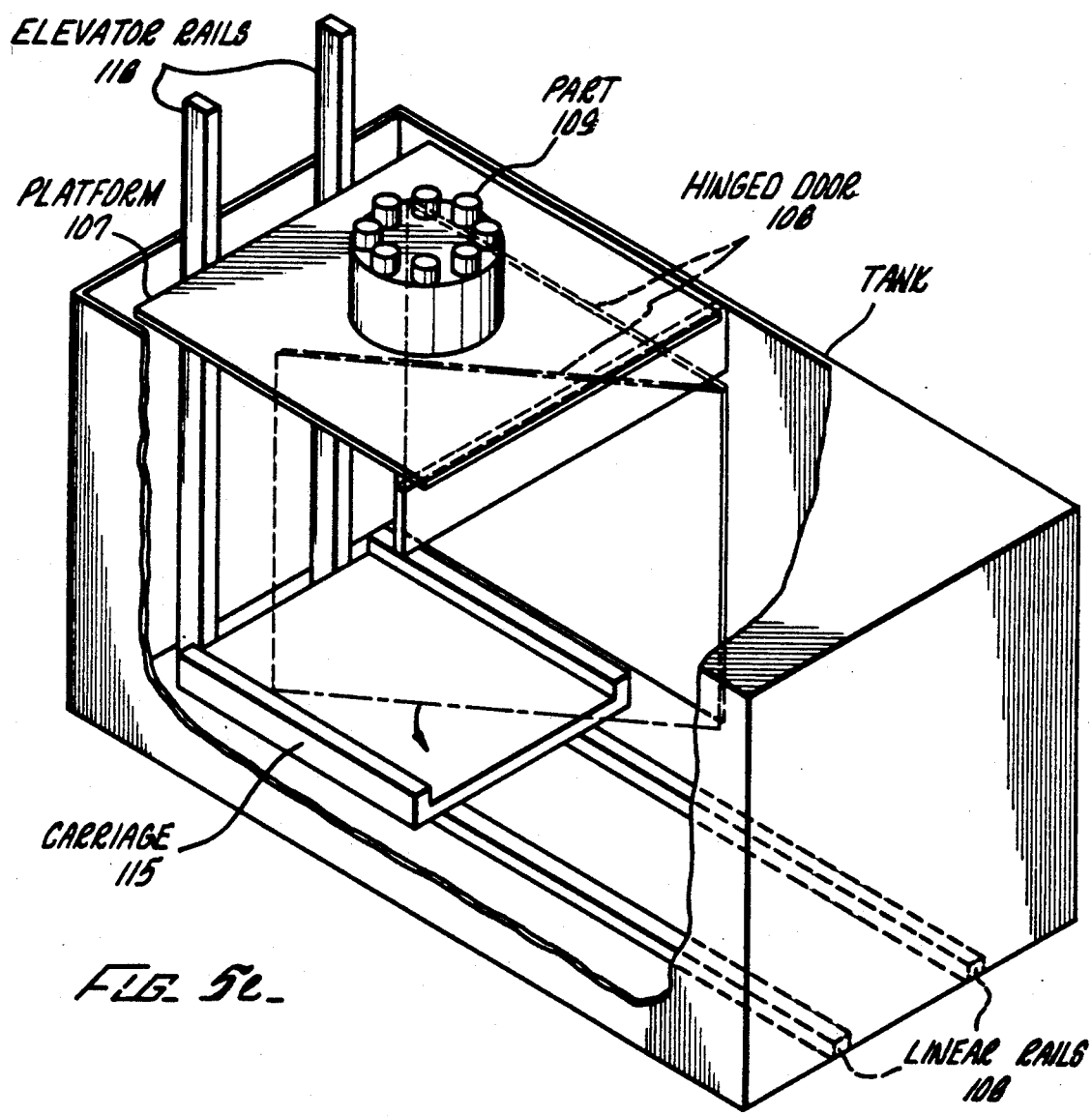

STEREOLITHOGRAPHY METHOD AND APPARATUS

BACKGROUND OF THE INVENTION

1. Field of the Invention

This invention relates generally to an improved stereolithographic method and apparatus of the type for building a part at the surface of a volume of liquid resin, the improvement comprising building the part on the surface of a layer of the resin, which layer is supported by a volume of a dense, immiscible liquid, and then performing additional stereolithographic processing on at least a portion of the built part while it is immersed in the liquid.

2. Cross-Reference to Related Applications

This application is related to the following U.S. patent applications all of which are incorporated herein by the following reference:

| Serial No. | Status |
|---|---|
| 07/182,830 | U.S. Pat. No. 5,059,359 |
| 07/183,015 | U.S. Pat. No. 5,015,424 |
| 07/182,801 | U.S. Pat. No. 4,999,143 |
| 07/183,016 | U.S. Pat. No. 4,996,010 |
| 07/268,816 | U.S. Pat. No. 5,058,988 |
| 07/268,907 | U.S. Pat. No. 5,059,021 |
| 07/268,408 | Abandoned |
| 07/268,428 | Abandoned |
| 07/268,429 | Pending |
| 07/331,644 | Pending |

3. Background of the Invention

Stereolithography refers generally to the process of reproducing a part by curing successive two-dimensional cross-sections of the part at the surface of a volume of a liquid resin and then stacking the cross-sections together to form a high resolution reproduction of the part. The first step in the process is the part building step, whereby successive two-dimensional cross-sections of the part are formed using an apparatus known as a stereolithography apparatus (hereinafter "SLA"). The SLA builds the part by tracing successive cross-sections of the part at the surface of the liquid resin with synergistic stimulation, such as a UV laser beam or the like, at a sufficient exposure so that the exposed resin hardens, and successively lowering the cured cross-sections below the surface so that fresh liquid resin will flow over the cured cross-sections which will form the next cross-section. The extent to which the resin hardens beyond the surface is known as the cure depth. The SLA lowers the cured cross-sections to within a layer thickness of the surface of the liquid resin so that the next-cured cross-section will adhere to the already cured cross-sections. In this manner, a laminar build-up of the part is formed at the surface. This process is described in more detail in U.S. Pat. No. 4,575,330 (hereinafter the '330 patent), which is hereby fully incorporated by reference herein as though set forth in full.

In one embodiment of an SLA, illustrated in FIG. 1a, a volume of UV curable liquid resin 22 or the like is placed in vat 21 to form a designated working surface 23. UV light source 26 or the like is placed above the surface to produce synergistic stimulation which strikes the surface at point 27. The light source is controllably directed by computer control system 28 to draw successive patterns representing successive two-dimensional cross-sections of a part on the surface 23.

Cured cross-sections are formed on platform 29 which is also under the control of computer control system 28. After a cross-section is formed, the computer directs platform 29 to lower itself a particular distance further into the liquid resin 22, so that the cured cross-sections will be lowered below the surface, allowing fresh liquid resin to flow over the cured cross-sections. Optionally, the platform is lowered by more than one layer thickness, and then raised to within one layer thickness after the fresh liquid resin has flowed over the surface. Then, the computer directs the light source to draw out the next cross-section on the surface at a particular exposure so that the cross-section being formed has a sufficient cure depth to penetrate beyond the surface of the resin and adhere to the cured cross-sections.

In FIG. 1a, the laminar build-up of the part is indicated by reference numeral 30, and successive cross-sections of the build-up are indicated by reference numerals 30a, 30b, and 30c, respectively.

Another embodiment is illustrated in FIG. 1b. As illustrated, a layer 22 of UV curable liquid resin or the like is supported by a heavier, UV transparent, non-miscible liquid 32. In addition, the non-miscible liquid supporting the layer of liquid resin is placed in a vat 21, which has a UV transparent window 33, constructed of quartz or the like, at the bottom of the vat. UV light source 26 or the like is placed below the bottom of the vat and synergistic stimulation from the source is directed by the control computer to pass through the window and the intermediate liquid to strike and cure the liquid resin from below, which curing takes place at the interface 23 between the resin and the non-miscible liquid, which interface is the lower surface of the resin layer. The UV light strikes the resin/liquid interface at point 27, and is directed by the computer to draw patterns representing cross-sections at the interface.

The first cured cross-section adheres to platform 29. In certain instances, other cross-sections may also adhere to the platform. After a cross-section is formed, platform 29 is controllably directed by the control computer to raise itself a particular distance so that a corresponding volume of fresh liquid resin will flow under the cured cross-sections at the interface 23. Optionally, the elevator may be raised more than one layer, and then dropped down to within one layer thickness after the fresh liquid resin has flowed under the cured cross-sections. Next, the control computer directs the UV light source or the like to trace a pattern of a next cross-section at the interface at a sufficient exposure so that the cure depth of the cross-section will be sufficient to adhere to the cured cross-sections.

Traditionally, an SLA, after building a part, does not perform any of the other steps in the overall stereolithographic process illustrated in FIG. 2a. This overall process will now be described. In step 1, a solid or surface model of a part is designed on a CAD system. In step 2, the CAD model is oriented in CAD space to minimize problems downstream with the remaining stereolithographic steps, and also a base or support is added to attach to and support the part while it is being built. In step 3, the CAD model is formatted to provide a generic surface representation of the part called an .STL file which is compatible with an interface specification required to communicate the file to the SLA, and which interface enables the SLA to remain independent of the specific CAD system. In step 4, the .STL file for the part is "sliced" by a SLICE computer (with certain SLICE parameters such as layer thickness) to provide two dimensional cross-sectional data descriptive of successive cross sections of the part. Collectively, the cross-sectional data is referred to as an .SLI file. In addition, portions of the .STL file, representing the base or support for example, are optionally "sliced" separately to form their own .SLI files with different SLICE parameters from that used to slice other portions of the file. In step 5, the .SLI files are transmitted from the SLICE computer to another computer known as the PROCESS computer via ETHERNET or floppy disk. In step 6, all the .SLI files for a part are merged into a single file. In step 7, the user specifies certain part building parameters such as cure depth, exposure times, and laser delay and stepping values, as required by the part's geometry and end use. The laser beam does not move over the resin surface continually, but instead, moves in steps over the surface with a delay at each step. The laser step size and delay largely determines the exposure and hence cure depth achieved. In step 8, which is the part building step, the UV laser beam is directed by the PROCESS computer to trace out patterns represented by the two-dimensional cross-sectional data with the building parameters specified in step 7, with the result that the liquid resin is cured where the laser strikes to form successive layers of the part at the surface. The first layer adheres to a horizontal platform located just below the surface of the liquid resin. The platform is connected to an elevator which lowers the platform also under control of the PROCESS computer. After a layer is cured, the platform is caused to dip into the liquid so that fresh liquid will flow over the cured layer to provide a thin film from which the next layer will be cured. The next layer is drawn after a pause to allow the liquid surface to level. The exposure of the UV laser and the thickness of the fresh liquid are controlled so that the cure depth of the next layer is such that it will adhere to the cured layer. The process is repeated until all layers have been cured to form a reproduction of the three-dimensional part. In step 9, the part is drained to remove excess resin (hereinafter referred to as part cleaning), the part is then ultraviolet cured to complete the photopolymerzation process (hereinafter referred to as post-curing), and the supports are next removed. Optional finishing steps such as sanding, or assembly into working models and painting, may also be performed.

FIG. 2b illustrates the major components of an apparatus known as SLA-1 used to perform the steps described above. A more recent commercial embodiment is the SLA-250, which is functionally similar to the SLA-1, except for the addition of a leveling blade for leveling the surface of the higher viscosity resins typically used with the SLA-250. An even more recent embodiment is the SLA-500 which has a larger vat for building larger parts.

As illustrated, the major components comprise SLA 34 and post-curing apparatus 35 (hereinafter referred to as a "PCA"). The major subcomponents of the SLA are illustrated in FIG. 2c. As illustrated, the SLA comprises SLICE computer assembly 36, which is electrically coupled via ETHERNET to electronic cabinet assembly 37, which is also mechanically and electrically coupled to chamber assembly 38, and to optics assembly 39. As illustrated, the SLICE computer assembly comprises monitor 40, SLICE computer 41, and keyboard 42, integrated together as shown. The SLICE computer also interfaces to a CAD/CAM system (not shown) either through ETHERNET, floppy disks, or any other data transfer method, for the transfer of the .STL files.

The electronic cabinet assembly is illustrated both in FIGS. 2c and 2e, in which like components and subcomponents are identified with like reference numerals. As illustrated, the electronic cabinet assembly is coupled to the SLICE computer assembly by means of ETHERNET cable 43. Moreover, the electronic cabinet assembly, in turn, comprises PROCESS computer 44, keyboard 45, and monitor 46, integrated together as shown in FIG. 2c. In addition, as illustrated in FIG. 2e, the assembly further comprises laser power supply 47, and other power supplies (not shown) for the high-speed dynamic mirrors 49, and for the elevator motor 50. The assembly further comprises AC power distribution panel 48, a control panel (shown but not identified with a reference numeral), plug-in circuit boards for control of the monitor, keyboard, and optional printer (not shown), plug-in driver (not shown) for control of the high-speed dynamic mirrors, and plug-in driver (not shown) for control of the vertical (Z-stage) elevator. The control panel includes a power on switch/indicator, a chamber light switch/indicator, a laser on indicator, and a shutter open indicator.

Operation and maintenance parameters, including fault diagnostics and laser performance information, are displayed on the monitor. The operation of the PROCESS computer is controlled by keyboard entries. Also, work surfaces around the keyboard and disc drive are covered with FORMICA for efficient cleaning and long wear.

The optics assembly is illustrated in FIG. 2c, and comprises laser 51, laser cover 52, shutters 53, beam turning mirrors 54a and 54b, beam expander 55, dynamic mirrors 56, and optics cover 57. As illustrated, the laser and related optical components are mounted on top of the electronic cabinet and chamber assembly. Also, the laser and optics are covered with laser and optics covers 52 and 57, respectively, which may be removed to service the laser and optics. For safety reasons, the covers are attached to the chamber and electronic cabinet assembly with fasteners, and a special tool is required to unlock the cover fasteners. In addition, interlock switches are activated when the covers are removed. The interlock switches activate dual solenoid-controlled shutters to block the laser beam when either cover is removed.

The laser is preferably a helium cadmium (HeCd) laser. In addition, the shutters, beam turning mirrors, beam expander, and dynamic mirrors are all mounted on an optics plate (not shown) placed on top of the electronic cabinet and chamber assembly. As illustrated, the shutters are preferably rotary solenoid-activated shutters which are situated at the laser output to block the laser beam when a safety interlock is opened. The beam-turning mirrors reflect the laser beam along an optical path through the beam expander, which enlarges and then focuses the laser beam so it will achieve a certain size on the surface of the liquid resin. The dynamic mirrors are under control of the PROCESS computer, and direct the laser beam to trace out patterns on the surface of the liquid resin according to the cross-sectional data provided by the SLICE computer. A quartz window (not shown) separates the optics assembly from the chamber assembly, in which is placed in the liquid resin. The dynamic mirrors direct the laser beam along an optical path through the quartz window to the liquid resin surface. The quartz window allows the laser beam to enter the chamber assembly, but otherwise isolates the two assemblies.

The chamber assembly is illustrated in FIGS. 2c and 2d. As illustrated in FIG. 2c, the chamber assembly 38 comprises a chamber (not identified with a reference numeral), chamber door 57 which opens into the chamber, storage compartment 58, and storage compartment door 59. Turning to FIG. 2d, the chamber assembly further comprises platform 60, reaction vat 61, elevator 62, a first beam profiler 63, a second beam profiler (not shown) diagonally located across the vat from the first beam profiler, heater/fan 64, air filter 65, chamber light 66, and shelf 67.

The chamber in which the part is formed is designed for operator safety and to ensure uniform operating conditions. The chamber may be heated to approximately 40 degrees C. (104 degrees F.) by means of the heater/fan, and the air in the chamber is circulated and filtered by means of the heater/fan and air filter. The overhead light illuminates the reaction vat and work surfaces. An interlock on the cabinet door, preferably a UV blocking plexiglass access door, when opened, activates a shutter to block the laser beam.

The reaction vat is installed in the chamber on guides which align it with the elevator and platform. The liquid resin is then placed in the vat.

The platform is attached to the vertical axis (or Z-stage) elevator. A part is formed cross-section by cross-section on the platform which is successively immersed in the liquid resin and therefore lowered into the vat while the part is being formed. After a part is formed, the platform on which the part is placed is raised to a position above the vat, and then disconnected from the elevator and removed from the chamber for post processing. Handling trays are provided to catch dripping resin.

The beam profilers are mounted diagonally across the reaction vat from one another at the focal length of the laser. The dynamic mirrors are periodically directed to direct the laser beam onto the beam profilers, which measures the beam intensity profile. The data may be displayed on the terminal either as a profile with intensity contour lines or as a single number representing the overall (integrated) beam intensity. This data is used to determine whether the mirrors should be cleaned and aligned, whether the laser should be serviced, and what building parameter values such as laser stepping and delay values (which together largely determine exposure) will yield cured resin of a particular cure depth and width.

The PCA is illustrated in FIG. 2f. As illustrated, the PCA comprises a chamber (not identified with a reference numeral), UV lamps 68 on adjustable stems, turntable 69, front and top doors 70a and 70b, respectively, with respective front and top UV blocking windows 73a and 73b, cooling and vent fan 71, control panel 72 with power switch and timer (not shown), and stand 74.

The UV lamps are preferably three 400 watt metal-halide UV-enhanced lamps, with reflectors, which can be positioned in the chamber for optimal post curing. The turntable is preferably a one revolution per minute turntable which rotates the part for uniform post-curing. The doors, located at the front and top, are for loading and unloading parts. Both doors are interlocked to turn off the UV lamps and turntable when they are opened, and have UV blocking windows to block the passage of UV light to allow safe viewing of the parts. The cooling and vent fan is preferably a 240 cubic feet per minute fan.

Turning again to FIG. 2a, as indicated, after a part is built, it is further processed in a post-processing step. A typical post-processing step is comprised of the following substeps:

1) Raising the part out of the vat of resin.
2) Allowing the part to drain into the vat (e.g. from about 10 minutes to about an hour).
3) Removing the part (and platform, if desired) from the SLA and placing it on an absorbent pad.
4) Optionally placing the part/platform in a low temperature oven (heated to a temperature between room temperature and a temperature effective for thermally curing the resin, e.g., from about room temperature to about 100 degrees C., and preferably from about 60 to about 90 degrees C.).
5) Optionally removing excess resin with cotton swabs.
6) Optionally coating the part surface with resin to give good surface finish.
7) Optionally giving the part a quick exposure of flood UV (or other radiation as appropriate for the photoinitiator in the resin) to set the surface.
8) Optionally immersing the part in cool water, such that the water fills all cavities in the part, if possible.
9) Applying flood UV light to the part (or other radiation as appropriate for the photoinitiator in the resin), optionally while the part is under water (or another appropriate liquid medium).
10) Optionally rotating the part as necessary to provide a uniform cure.
11) Removing the part from the platform, if necessary.
12) Repeating substeps 6–10, if necessary.

As set forth in more detail in co-pending U.S. patent application Ser. No. 268,408, in carrying out substeps 3) and 4), once the part is placed on the absorbent pad, it can be left to drain in the open air at room temperature for a period of time ranging anywhere from minutes to a couple of days, after which time it can be placed into an oven or otherwise heated. In addition, the following, sometimes competing, considerations should be balanced when carrying out these substeps. It is important to avoid part warpage due to temperature, gravity, or other conditions capable of exerting a force on the part; to remove all excess resin from the surfaces of the part before further post-processing; and to avoid over absorption of oxygen, which inhibits post curing (substeps 8), 9) and 10) above) since oxygen acts as an inhibitor of the chemical reaction involved in later photopolymerization.

Optionally, the use of solvents can be combined with the use of the absorbent pad and oven heating to drain the part. In this approach, the part is contacted, e.g. by spraying, brushing, soaking, or the like, with a solvent suitable for reducing the viscosity of the resin on the surface of the part, without leaching unpolymerized resin from inside the part. The liquid surface resin and the solvent form a solution of relatively lower viscosity, causing the resin to drain more quickly from the part. Suitable solvents depend on the resin, but are, in general, organic solvents, preferably of intermediate polarity, such as methanol, methlylethylketone, ethanol, isopropyl alcohol, trichloroethane, or the like.

As set forth in more detail in co-pending U.S. patent application Ser. No. 268,428, in carrying out substeps 6) and 7), surface discontinuities in the part may then be filled in with resin to provide a smooth surface finish. Surface discontinuities may arise, for example, because of the stepwise nature of part building, which may leave the part with a stairstep appearance and corresponding rough surface finish. The part may then be given a rapid exposure, e.g. from a few seconds to no more than about a minute, preferably about 15 to about 30 seconds, of flood UV light (or other radiation appropriate to the resin being used) to set the surface. The process of coating and setting with UV light can be repeated several times, as necessary, to obtain a smooth surface finish over the entire part. In addition, the UV light should strike the surface of the part as uniformly as possible, which can be accomplished, for example, by using multiple lamps simultaneously from different angles, by using high quality reflectors to distribute the light around the part, by rotating the part or the lamps, or the like. As described in more detail in the next section, the UV lamps are preferably mercury discharge or metal halide lamps, such as, for example, PHILLIPS' (Belgium) HPA 400S "MERCURY VAPOR BURNER."

As explained in co-pending U.S. patent application Ser. No. 182,830, and its co-pending continuation-in-part Ser. No. 331,644, sometimes the part is built deliberately undersized so that when the surface discontinuities caused by the stairstep appearance of the part are filled in, the part will be the right size. Alternatively, as explained in those applications, sometimes the part is built deliberately oversized so that after sanding to remove the stairstep appearance, the part will be the right size. Another alternative is to build a part as close as possible to the correct size. In these instances, substeps 6) and 7) are eliminated.

As set forth in more detail in co-pending U.S. patent application Ser. No. which is now U.S. Pat. No. 4,996,010; and its co-pending continuation-in-part, Ser. No. 268,429, in carrying out substep 8), the part is then immersed in water, or another liquid medium such as a salt solution, a fluorocarbon such as trichlorotrifluoroethane, an organic solvent, such as polyethylene glycol telomers or ethanol, etc. during a flood UV exposure (or exposure to other radiation depending on the resin) of sufficient duration to completely cure the part. This substep may be necessary, since after the part building step, the part may not be completely cured, but instead may only be partially cured, and in a corresponding "green" state.

The liquid medium preferably has a similar specific gravity to the partially polymerized part, to provide an optimum level of buoyancy, such that distortion risks due to gravity are minimized; preferably absorbs infrared radiation coming from the UV light source so that the part is not heated by the infrared energy, and also absorbs heat away from the part that is generated during the polymerization reaction; and preferably acts as a heat exchanger by transmitting heat away from the part without a pronounced increase in the temperature of the liquid medium itself. Preferably, the liquid and part are at ambient temperature when the part is immersed in the liquid, e.g. the liquid is generally between about 15 and about 35 degrees C. Ideally, the liquid temperature is maintained at a selected level, typically within plus or minus 5 degrees C., as long as there is sufficient water to contribute a large enough thermal mass such that its temperature does not change dramatically during exposure to radiation from the UV lamps during the curing process. Optionally, the liquid can be recycled through a heat exchanger to maintain it substantially at room temperature and to reduce the quantity of water required. Another option is to filter the liquid to remove impurities, or the UV light may be filtered to remove certain peak absorption wavelengths from the impinging radiation to promote uniform curing by adding a suitable photoinitiator to the liquid to perform the same function.

Post-curing is performed using the PCA illustrated in FIG. 2f, which is described in the earlier section. The part is first placed in a vessel transparent to UV light, such as a quartz or PYREX container, and should then be placed inside the PCA and situated with respect to the UV light so that the UV light strikes the entire surface of the part as uniformly as possible.

As with substeps 6) and 7), this can be carried out by using multiple lamps simultaneously from different angles, using high quality reflectors to distribute the light around the part or by rotating the part or the lamps or the like.

The UV lamps are preferably high pressure mercury discharge or metal halide lamps, such as, for example, Phillips' (Belgium) HPA 400S "MERCURY VAPOR BURNER." The UV light is typically of mixed wavelengths in the about 250 to about 750 nm range, with the majority in the range of about 300 to about 400 nm. Moreover, the intensity of the light striking the surface is about 20 mW per square cm to about 100 mW per square cm in the about 300 to about 400 nm range. The post-cure time will typically range from about 7 to about 15 minutes.

A significant disadvantage of the above approach is that the post-processing substeps are manual, time-consuming, and subject to significant errors in operating conditions because of the absence of computer control of these substeps. In addition, these substeps are typically performed in physically separate areas, which require the part to be transported from area to area to complete the stereolithographic process, and also require a large physical area. The result is that the overall stereolithographic process is extremely fragmented.

In addition, regarding post-processing substeps 2)-5), the part cleaning substeps, additional problems are that it is difficult to completely remove excess resin, especially from difficult-to-reach areas of the part such as corners or detailed features using thermal draining, and it is also difficult to efficiently dispose of the excess resin. If a solvent is used, disposal of the solvent intermixed with resin is also a problem. Even if the part is allowed to drain on an absorbent pad, the absorbent pad must be disposed of after the part has drained excess resin into it. Disposal is an important environmental consideration, as the resin tends to be tacky and difficult to clean up, and certain resins may have a level of toxicity associated with them, so that disposal may be complicated from a health perspective. Moreover, the exposure of the part to oxygen may inhibit subsequent post-curing because of the action of oxygen in inhibiting polymerization. Also, the action of gravity while the part is draining may distort the part. In addition, the optional use of cotton swabs in substep 5) to clean hard-to-reach portions of the part is very time consuming, and also does not readily provide for uniform application from part to part. Finally, in substep 4), the low temperature oven, if allowed to act on the part too long, can lead to distortion and additional undesirable curing, especially if the resin is thermally-curable.

A disadvantage of the part-building step described above is that the inventory of resin required may be substantial, particularly for the building of large parts. The large inventory of resin is required since the size of the vat in which is placed the liquid resin must be scaled to the size of the part, and the entire vat must be filled with resin even though a part may only require a quart of resin to build, and the resin which remains in the vat may have to be replaced about every six months or less, since this is the shelf-life of the resin. A large inventory may be required to replenish this turnover without significant delays. In addition, large parts may require a large vat, which may further increase the inventory requirements. In fact, the inventory required to support a large vat may be a reason why many commercial embodiments of SLA's are limited to building small parts. Besides the expense, the large inventory has the additional disadvantage that the pace of technological change in the development of resins is great, and a large inventory might become obsolete by the time it is used.

It is an object of the present invention to provide means with which to integrate the various stereolithographic steps or substeps described above together. Another object is to improve part-cleaning by making it more effective, by reducing the distortion which part cleaning may cause, and by reducing or eliminating the disposal problem. A further object is to reduce the resin inventory required for the building of larger parts.

SUMMARY OF THE INVENTION

The present invention is directed to an improved stereolithographic method and apparatus of the type for draining excess resin off of a part, the improvement comprising means for cleaning excess resin from at least a portion of the part with ultrasonic agitation while it is immersed in a liquid solvent.

The present invention is also directed to an improved stereolithographic method and apparatus of the type for building a part at the surface of a volume of liquid resin, the improvement comprising means for building the part at the surface of a layer of the resin supported by a volume of a dense, immiscible, UV transparent intermediate liquid, and means for performing additional stereolithographic processing on at least a portion of the built part while it is immersed in the intermediate liquid. Such additional stereolithographic processing may include subjecting the immersed portion to ultrasonic agitation, or flooding it with UV light.

The subject invention is also directed to an improved stereolithographic method and apparatus of the type for building a part by directing synergistic stimulation to impinge upon the surface of a volume of the liquid resin from above, the improvement comprising means for building a part by directing synergistic stimulation to impinge from above upon the surface of a layer of the resin supported by a volume of a dense, immiscible, UV transparent intermediate liquid.

The above and other objects and advantages of this invention will be apparent from the following more detailed description when taken in conjunction with the accompanying drawings of illustrative embodiments.

BRIEF DESCRIPTION OF THE DRAWINGS

FIG. 2b illustrates a commercial embodiment of an SLA and PCA used in the process of FIG. 2a;
FIG. 3a is a side view of a bench top vapor degreaser;
FIG. 3b is a perspective view of an embodiment of a vapor degreaser for larger parts;
FIG. 5b illustrates a frontal view of the travelling platform of FIG. 5a;
FIG. 5c illustrates a top view of the travelling platform of FIG. 5a;
FIG. 5e is a perspective view of the travelling platform of FIG. 5a;
FIG. 6b illustrates a side view of the single chamber vat embodiment of FIG. 6a.

DESCRIPTION OF THE PREFERRED EMBODIMENT

Figure 1A:
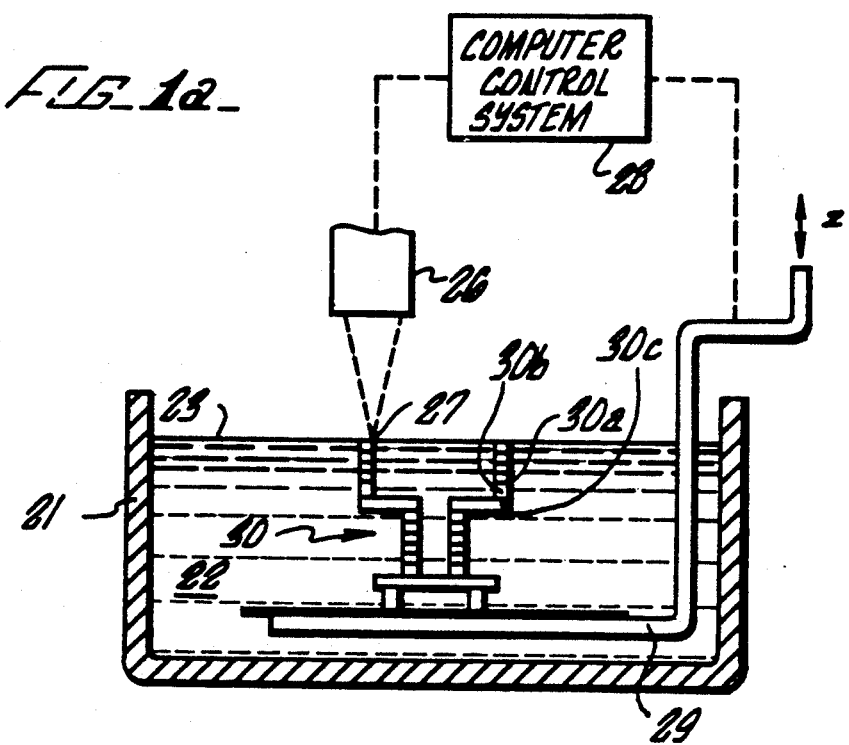
FIG. 1a illustrates an embodiment of an SLA.
Figure 1B:
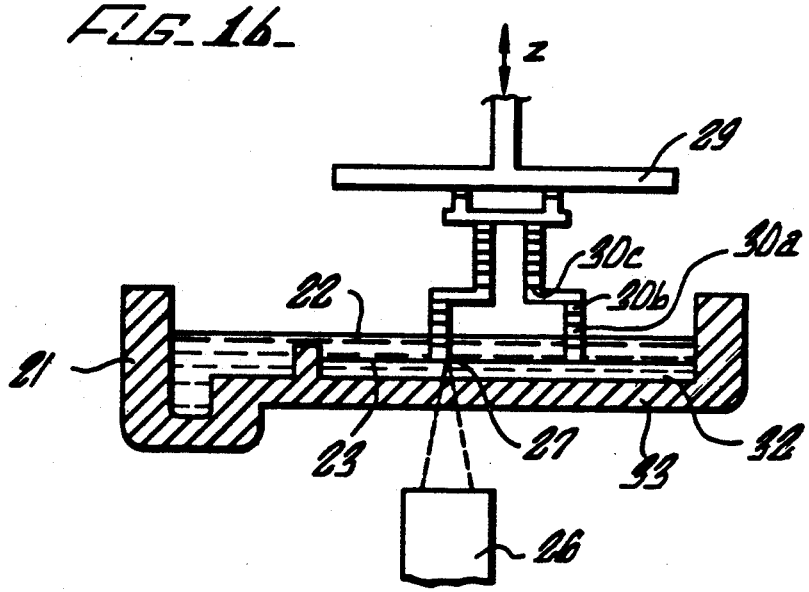
FIG. 1b illustrates a second embodiment of a SLA.
Figure 2A:
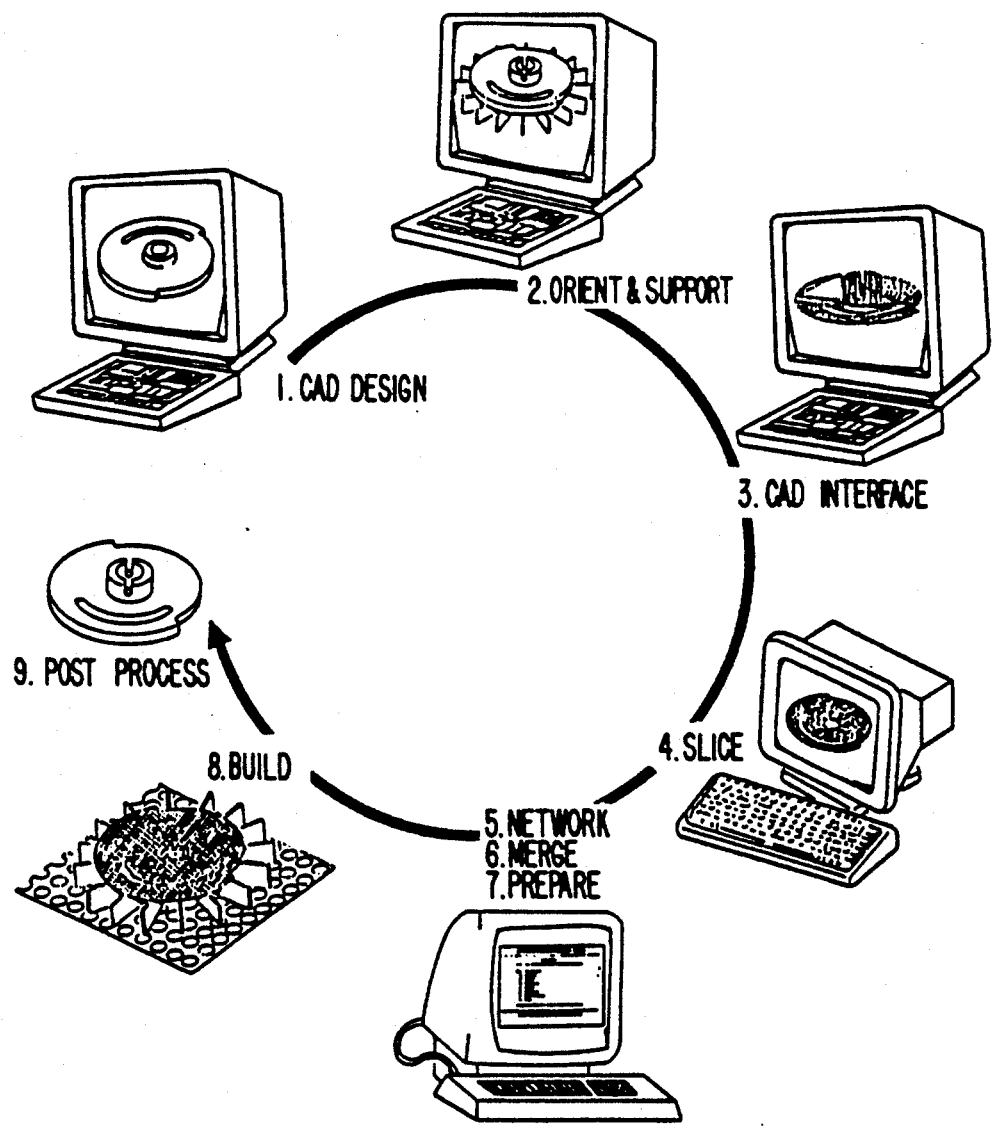
FIG. 2a illustrates steps in the overall stereolithographic process.
Figure 2B:
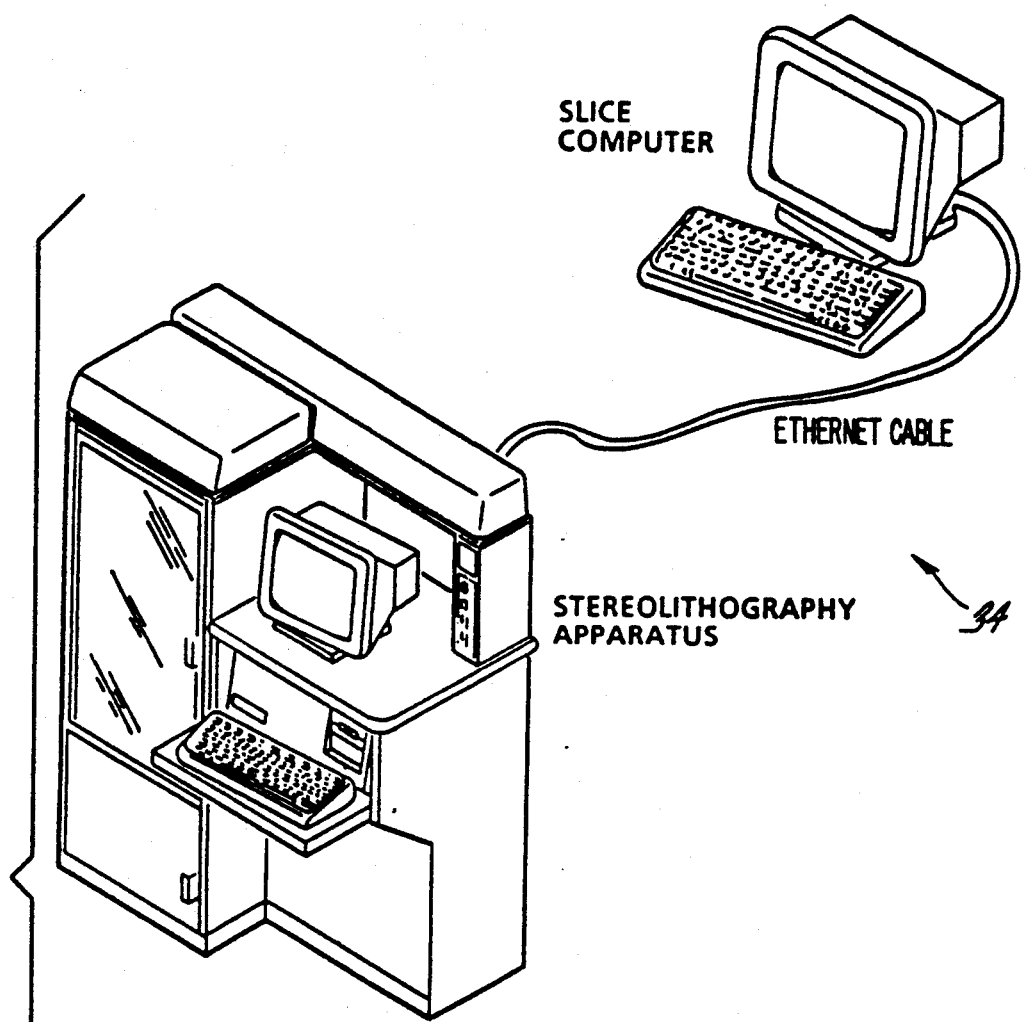
Figure 2B:
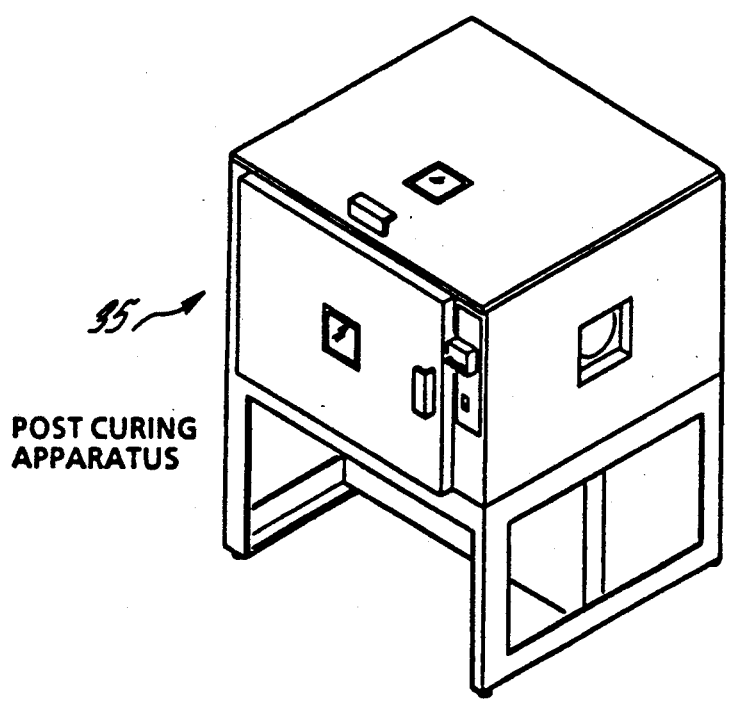
Figure 2C:
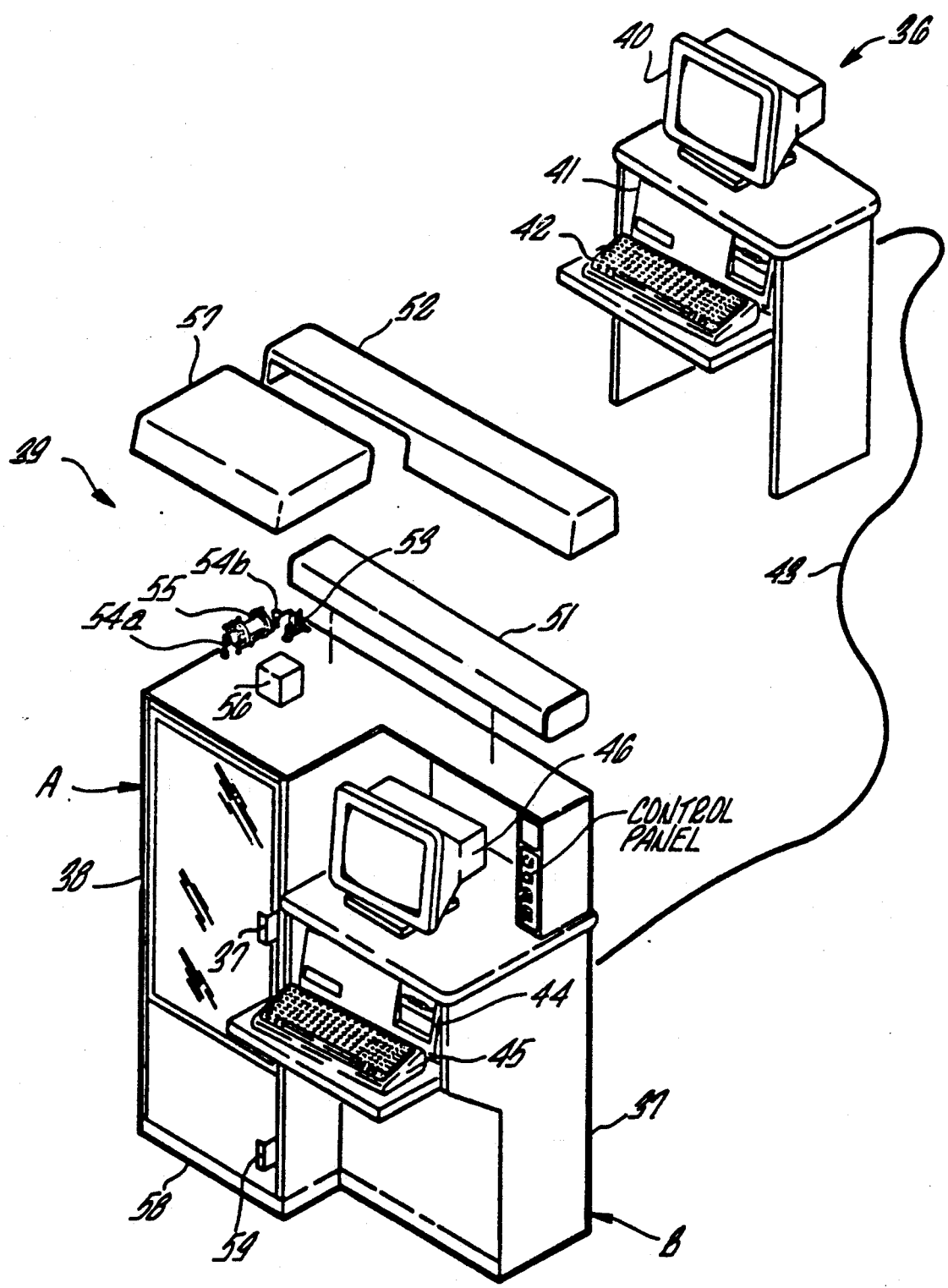
FIGS. 2c, 2d and 2e illustrate the major components and subcomponents of the SLA of FIG. 2b.
Figure 2D:
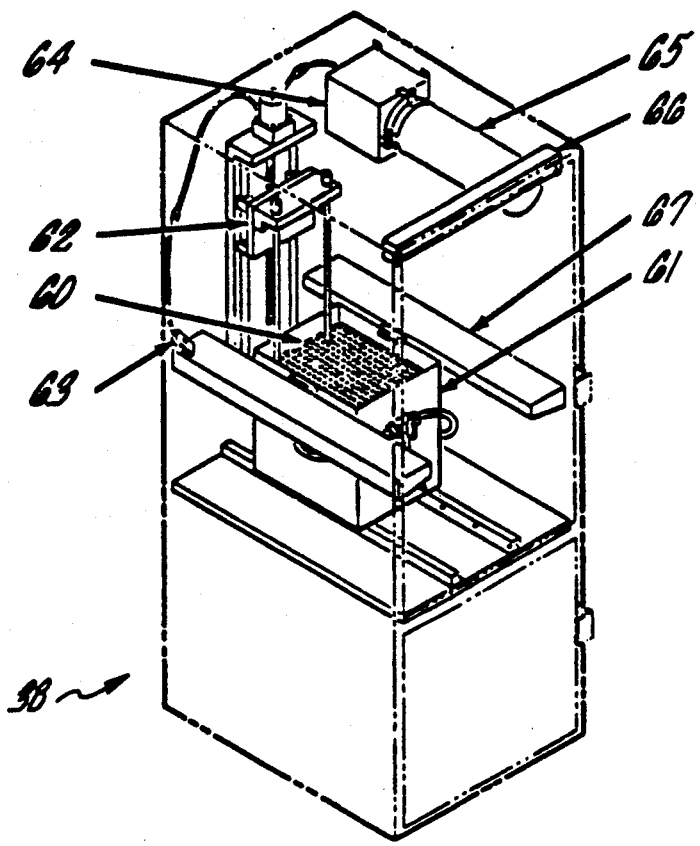
Figure 2E:
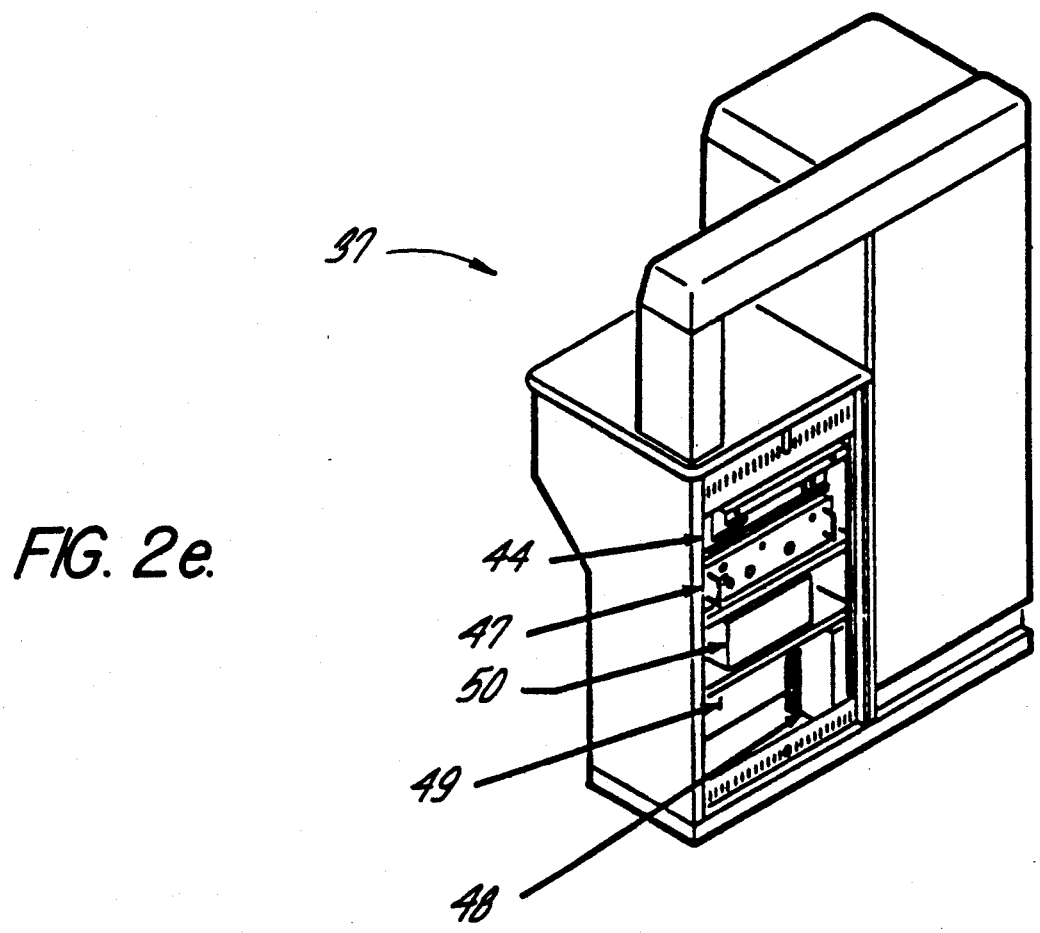
Figure 2F:
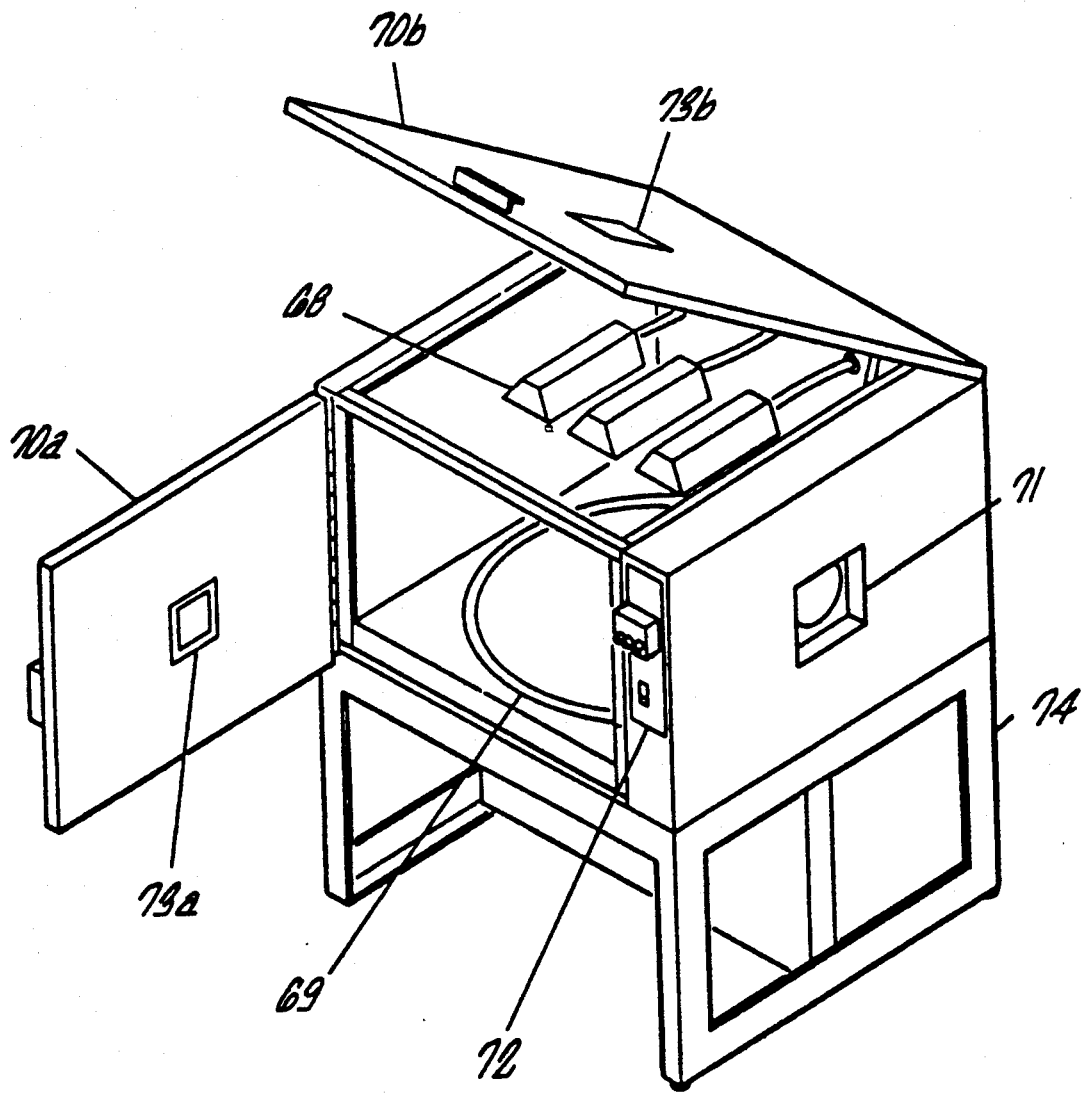
FIG. 2f illustrates the major components of the PCA of FIG. 2b.

An embodiment of the subject invention is illustrated in FIG. 3a. This embodiment provides improved means for part cleaning using a vapor degreaser such as a SONIX IV Model BT 612 BENCH TOP VAPOR DEGREASER. As illustrated, a vapor degreaser comprises boil sump 75, rinse tank 76, vapor zone 77 above the boil sump and rinse tank, refrigeration coils 78a and 78b which are at the top of the vapor zone, and freeboard area 79 above the vapor zone. Ultrasonic transducers (not shown) are situated below the bottom of the rinse tank. Also, a heater (not shown) is provided for heating the boil sump, and a refrigeration unit (not shown) is provided for cooling the refrigeration coils. The freeboard area is a buffer above the vapor zone which is required to help prevent vapor from the degreaser from escaping into the atmosphere. It helps achieve this by providing an area where any vapor that extends beyond the vapor zone can condense. Optionally, a spray wand (not shown) is also provided.

Figure 3C:
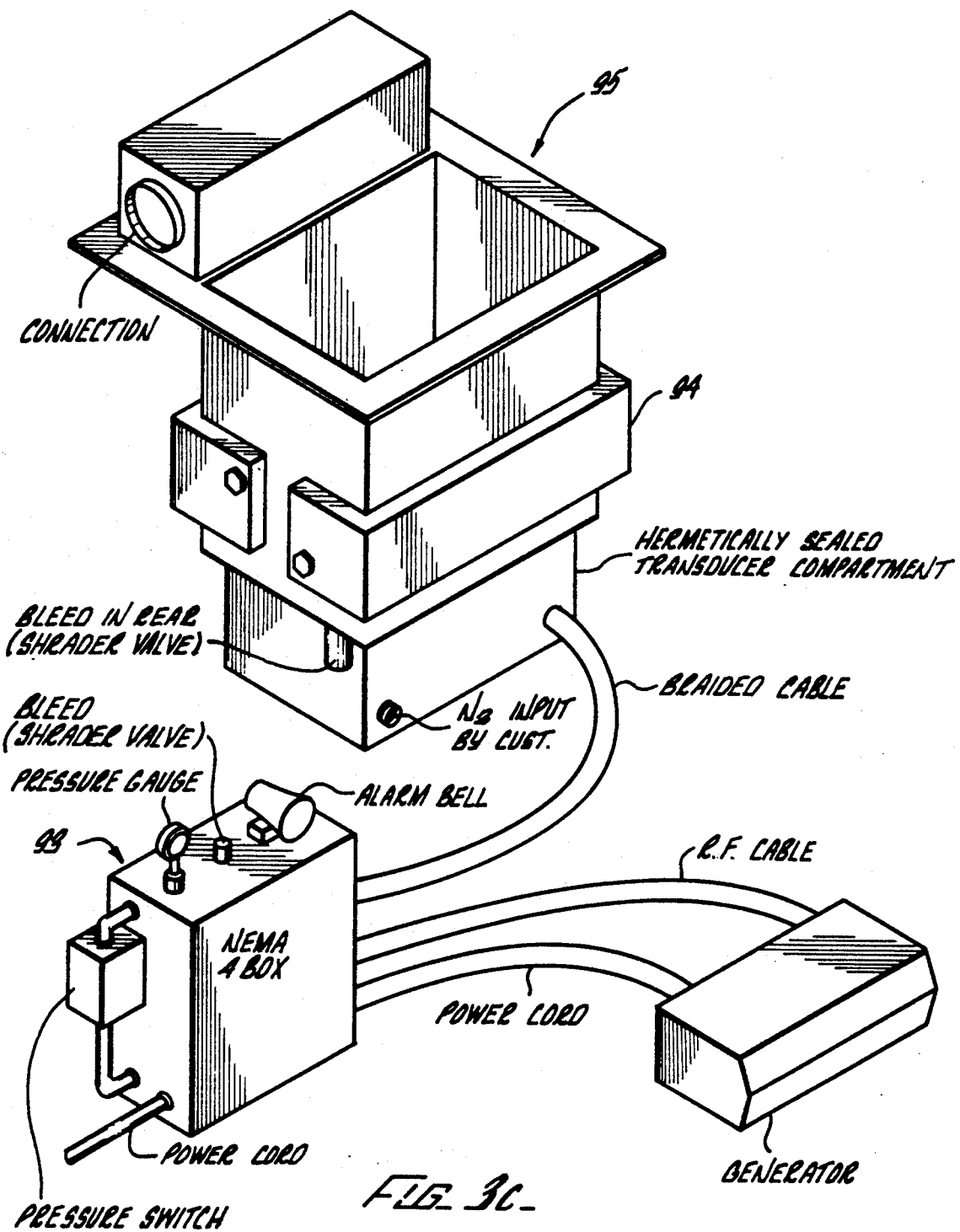
FIG. 3c is a perspective view of an embodiment of a vapor degreaser for use with flammable solvents.

The vapor degreaser operates as follows. First, a volume of a suitable cleaning solvent such as FREON TMS (preferably about a 94:6 (wt/wt) mixture of FREON TF and methanol), isopropanol, ethanol, propylene carbonate, water based cleaners, trichlortrifluoroethane (a/k/a FREON TF) or 1, 1, 1 trichloroethane (hereinafter "TCE") is placed in both the boil sump and the rinse tank. Other examples are possible, and the above is not intended to be limiting. In FIG. 3a, the volume of the solvent is indicated by liquid levels 80*a* and 80*b* respectively for the boil sump and the rinse tank. Isopropanol and ethanol, however, are flammable, and additional safety precautions should be made when using these solvents. (See FIG. 3*c* and associated text.)

Second, the boil sump is heated until the solvent boils, and thereafter evaporates (FREON TMS boils at about 103 degrees F., while TCE boils at about 165 degrees F.) (about 39 and 74 degrees C., respectively). Third, the refrigeration coils are cooled by the refrigeration unit, the cooled coils act to condense the evaporated solvent on the coils, and the condensed solvent then drips back into the rinse tank. By this action, the solvent is cleaned, since any contaminants of the solvent will be left in the boil sump when the solvent evaporates. This will be important for immersion cleaning (see below), whereby a part is cleaned by immersing it in the volume of solvent placed in the rinse tank. As the part is cleaned, excess resin will dissolve in the solvent. The solvent mixed with the dissolved resin will then spill over into the boil sump as indicated by reference numeral 81 in FIG. 3*a*, at which point the solvent will be cleaned through the evaporation and condensation process described above.

To clean a part, the part is immersed in the solvent situated in the rinse tank for about a few minutes, optionally while the ultrasonic transducers are turned on, and then removed. Advantageously, the ultrasonic transducers are tuned to a frequency of about 25 to about 40 KHz. The part should be immersed in the solvent for less than about ten minutes, preferably less than about five minutes, and most preferably less than about two minutes. If the part is immersed for more than about ten minutes, the part may distort. This process may be repeated for hard-to-clean parts.

Alternatively, in the case of thin layers of excess resin, instead of immersing the part in the liquid solvent, the part can be cleaned by placing it within the vapor zone and immersing it in the solvent vapor. The action of the solvent vapor in condensing on the part, and then dripping off of it, cleans the part. As indicated earlier, the vapor zone is the area above the boil sump and resin tank where the solvent vapor collects. The outer limits of the vapor zone is largely determined by the condenser coils on which the solvent vapor condenses.

Another alternative to immersion cleaning besides vapor cleaning is spray cleaning, whereby the spray wand is used to spray solvent on the part.

Another example of a vapor degreaser embodiment of the subject invention for larger parts is shown in FIG. 3*b*. As illustrated, this example comprises degreaser 82 and still 83, which are coupled together as shown with pipes 89*b* and 89*c*. The degreaser comprises main tank 92, overflow tank 84, weir 85, pump 86, filter 87, valve 88*a*, and pipe 89*a*. As illustrated, a volume of solvent is placed in the main tank as indicated by liquid level 90*b*, which can spill over through the weir into the overflow tank. The liquid solvent which spills over into the overflow tank is indicated by liquid level 90*a*. In addition, the pipe is coupled to the overflow tank near the bottom, which coupling is indicated by reference numeral 91*a*, and is also coupled at the other end to the main tanks, which coupling is indicated by reference numeral 91*b*. Spaced along the pipe starting from end 91*a* is valve 88*a*, pump 86, and filter 87. Also provided is an ultrasonic transducer (not shown) placed in the main tank.

The still comprises main tank 83*a* into which is placed the volume of solvent, which is indicated by liquid level 90*c*. The still also comprises a heater (not shown) for heating the solvent in the still to its boiling point and thereafter evaporating the solvent, refrigeration coils (not shown) placed above liquid level 90*c* for condensing the evaporated solvent, and a vapor zone (not shown) placed between the liquid surface and the refrigerator coils. Note that the refrigeration coils are situated so that condensed solvent collects in separator 83*b*. The separator acts to separate out water which may have condensed in the solvent. (Of course, in the case of water-based solvents, this may not be necessary.) Pipe 89*c* is located between the overflow tank of the degreaser and the still as shown. Between the ends of the pipe is valve 88*b*. Pipe 89*b* is coupled to separator 83*b* of the still at one end, which coupling is indicated by 91*d*, and is also coupled to the main tank of the degreaser at the other end, which coupling is indicated by reference numeral 91*c*. Also provided as part of the still is drain 83*c*.

The example of FIG. 3*b* has two modes of operation: a degreasing mode and a distilling mode of operation, which will each be explained in turn.

In the degreasing mode, valve 88*b*, situated between the still and the degreaser, is closed. In addition, the still is turned off. First, the pump is turned on, and solvent will thereafter be pumped out of the overflow tank at 91*a* and through the filter back into the main tank at 91*b*. Second, solvent will thereafter flow over the weir and into the overflow tank ready to be pumped through the filter again.

The part is immersed in the main tank for about a few minutes until it is clean. The agitation of the solvent as it is pumped through the filter acts to clean the part. Also, the solvent in the main and overflow tanks is kept at ambient temperature, which is about 23°–24 degrees C. Optionally, the ultrasonic transducer can be turned on to agitate and further clean the part through ultrasonic vibrations.

The function of the distilling mode of operation is to clean the dirty solvent. The solvent should be cleaned periodically such that the resin content remains below about 20% by weight, and preferably below about 5% by weight. In this mode of operation, the pump is turned off, and valve 88*b* between the overflow tank of the degreaser and the still is opened. The still then operates to clean the solvent in a similar manner to that discussed earlier with respect to the bench top degreaser. Dirty solvent (which is intermixed with dissolved resin) flows into the main tank of the still through pipe 89*c*. Then, the heater in the still heats the dirty solvent to the boiling point whereupon it evaporates and condenses on the refrigeration coils which are cooled by the refrigerator unit. The condensed solvent then drips into the separator, whereupon it flows to the main tank of the degreaser through end 91*c* of pipe 89*b* by means of the force of gravity. The contaminants remain in the liquid solvent which stays at the bottom of the main tank of the still, and this solvent can eventually be removed by opening drain 83*c*.

A suitable commercial degreaser for this example is the CALSONICS Co. Model CT-2424-RS REFRIGERATED SOLVENT CLEANING TANK. A suitable commercial still for this example is a BRANSON Series BRS-40 SOLVENT RECOVERY STILL.

The bench top degreaser of FIG. 3*a* comes with a refrigeration unit included. The larger CALSONICS degreaser of FIG. 3*b* should have a refrigeration unit added when using FREON TMS as the solvent because of its lower boiling point. Alternatively, if TCE is used, a less expensive approach is to use chilled water for cooling.

Optionally, the CALSONICS degreaser of FIG. 3b could be fitted with two HPA 400 UV lamps, the same lamps as used for the PCA described earlier. This will allow parts, after they have been cleaned, to be post-cured either while immersed in the liquid solvent or the solvent vapor. However, post-curing while the part is immersed in a solvent liquid may be preferable to post-curing the part while immersed in vapor since the UV light may break down the vapor into a corrosive material which can rust the stainless steel of the degreaser main tank. In this instance, about 2% nitromethane can be added to the solvent to inhibit this breakdown.

In the case of a flammable solvent such as ethanol, it may be important to add certain hardware features for safety purposes such as explosion-proof electronics, cooling means to prevent overheating of the solvent, and an exhaust duct to carry away flammable vapors. An embodiment of a vapor degreaser incorporating the above hardware features is illustrated in FIG. 3c. The particular embodiment illustrated was designed by BRONSON, but other examples are possible.

As illustrated, the embodiment achieves explosion-proof electronics by remotely locating power supply 93 from the main body of the degreaser, identified with reference numeral 95, and keeping the other electronics (not shown) under positive pressure of nitrogen.

Cooling is provided by water jacket 94, which is wrapped around the body of the degreaser as shown. Optionally, cooling could be provided with a timer to prevent the extent to which the solvent is allowed to heat up.

An exhaust fan (not shown) could be provided, interlocked to the power supply so that fumes would be sucked away during operation. In addition, means should be provided for guiding the exhaust fumes to the outside.

Otherwise, the FIG. 3c embodiment operates in a similar manner to the embodiments described above. Specifically, for use with flammable solvents, the modifications shown in FIG. 3c could be added to the bench top degreaser of FIG. 3a, or alternatively, could be added to the degreaser of FIG. 3b for use on larger parts.

The examples illustrated in FIGS. 3a, 3b and 3c provide a means for part cleaning using either immersion, vapor, or spray cleaning with a suitable solvent such as FREON TMS, FREON TF, TCE, ethanol, isopropanol, propylene carbonate, or water-based cleaners. Other examples are possible, and the above is not intended to be limiting.

In the case of immersion cleaning, optional physical agitation by means of a pump or ultrasonic agitation by means of ultrasonic transducers can be provided to enhance the effectiveness of the cleaning. In addition, post-curing can be optionally integrated into the examples of FIGS. 3a, 3b or 3c through the installation of UV flood lamps into the degreaser.

Any of the above approaches are superior when compared to draining, since the solvent/resin disposal problem is substantially reduced, if not eliminated. In fact, all the above approaches provide a means to clean and reclean dirty solvent. In the case of draining, on the other hand, any excess resin or dirty solvent must be disposed of. Even if an absorbent pad is used to capture drainage, the pad must be disposed of.

The above approaches also may significantly reduce the time required to clean the part compared with draining, which is advantageous since it reduces the time the part is exposed to oxygen before post-curing. As discussed earlier, oxygen exposure inhibits post-curing. In addition, draining, particularly thermal draining, can result in significant distortions of the part, through the force of gravity on the part after thermal weakening of the part at higher temperatures, which distortions are reduced or eliminated with the above approaches. Another benefit is that immersion cleaning in a liquid solvent coupled with physical or ultrasonic agitation will clean hard-to-reach areas of a part. In addition, the use of ultrasonic transducers or physical agitation means can reduce the time a part is immersed in a solvent. This is advantageous, since prolonged immersion or thermal draining can distort the part.

The above approaches are also beneficial because they result in a cleaned part which is nearly dry to the touch, and tack free, and which retains a good surface definition. Regarding spray cleaning, spray cleaning with a mixture of solvent/compressed air is effective for cleaning large parts, and water-based solvents are particularly effective for spray cleaning.

A consideration with the use of a bench top degreaser in conjunction with FREON TMS is that solvent in the rinse tank may become saturated with resin in about several hours, so that excess resin may float to the surface of the liquid solvent.

In this instance, the degreaser can be fitted with an automatic skimmer, and the resin layer can be skimmed off and discarded. Optionally, the generation of the floating layer can be inhibited by enriching the solvent with methanol, which increases the solubility of the solvent for dissolved resin. Preferably, any additional methanol should be added to the boil sump since the 94:6 weight mixture of FREON and methanol (which constitutes FREON TMS) should be kept approximately constant in the rinse tank for purposes of cleaning efficiency. The additional methanol can be added to the boil sump without compromising this ratio in the rinse tank because the 94:6 by weight mixture is the only azeotrope of FREON and methanol. As a result, it will have a lower boiling point than any other mixture, and will vaporize at a lower temperature than the other mixtures. Therefore, if the temperature is kept low enough, only the 94:6 weight mixture will vaporize regardless if additional methanol is added to the boil sump, and only this mixture will condense in the rinse tank.

An important aspect of other embodiments of the subject invention is supporting a layer of liquid resin on the surface of a volume of a dense, immiscible, UV transparent, intermediate liquid. The intermediate liquid should be dense enough to support the resin, and in addition, should be appropriate for immersion cleaning and immersion post-curing. As will be described in the body of this application, the use of the intermediate liquid to support a resin layer provides a means for part cleaning and post-curing to be integrated with part building so that a single apparatus can perform all these functions. Another advantage is that the use of a floating layer will reduce the resin inventory required, making it less costly to build large parts. The thickness of the resin layer can, in principle, be only one building layer, i.e., about 10-20 mils, but an implementation which may be easier would provide for about several inches of resin floating at the surface, so that control of the thickness may be unnecessary during part building. If only one building layer thickness were provided, then during part building, the thickness of the resin layer may have to be monitored, and the resin layer may have to be replenished after each cross-section were cured.

Many intermediate liquids can be used. The main requirements of the liquids are that they be approximately denser than the resin, substantially insoluble in it, and substantially transparent to UV light. The liquids should be approximately denser than the resin so that they will support the resin layer, and so that any excess resin shaken off during part cleaning will float to the surface and rejoin the resin layer. This will make it unnecessary to distill and reclaim the intermediate liquid in order to reuse it. They should be substantially insoluble in the resin so that they will remain separated from the resin layer which could otherwise mix with it, and inhibit passage of the synergistic stimulation, such as UV light or the like, through the liquid. Also, they should be substantially insoluble in the resin so that distillation and reclamation of the liquids will not be required to clean them. Finally, they should be substantially transparent to synergistic stimulation such as UV light or the like so that a part can be post-cured while immersed in the liquids.

Regarding the density requirement, the intermediate liquid should be at least about 5% more dense than the resin. For example, a preferred resin used in a current commercial embodiment of a stereolithography apparatus (which commercial embodiment is referred to as the SLA-250) is CIBATOOL XB-5081, which has a density of about 1.14 g/ml. It has been found that an intermediate liquid having a density of at least about 1.2 g/ml will be acceptable with this resin. For example, a mixture of magnesium sulfate in water is possible having a density of at least about 1.2 g/ml. Another example is a mixture of sodium chloride in water which is possible having a density of about 1.2 g/ml. As large a difference in density as possible will insure clean and rapid separation of the liquid from the resin.

Regarding solubility, the liquid should be substantially insoluble in the resin. For example, current resins are moderately hydrogen bonded liquids with a solubility parameter of about 10 to about 12 (cal/cm$^3$).$^{\frac{1}{2}}$ For these resins, an appropriate intermediate liquid should have a solubility parameter as different from the solubility of the resin as possible. For example, a poorly hydrogen bonding liquid having a solubility parameter of less than about 7 (cal/cm$^3$).$^{\frac{1}{2}}$ will be possible. Aliphatic fluorocarbons are examples of such liquids having solubilities in the range of about 5.5 to about 6.2 (cal/cm$^3$).$^{\frac{1}{2}}$ Alternatively, a strongly hydrogen-bonded liquid with a solubility parameter of greater than about 20 (cal/cm$^3$).$^{\frac{1}{2}}$ is also possible. Water is an example of such a liquid having a solubility parameter of about 23.4 (cal/cm$^3$).$^{\frac{1}{2}}$ Additional examples can be found in "Polymer Handbook," 2nd Edition, Wiley-Interscience, pp. IV-337 and ff., which is hereby fully incorporated by reference herein as though set forth in full.

In addition to the solubility parameter discussed above, those skilled in the art may also use a qualitative measurement of solubility, and intermediate liquids are also possible based on this qualitative measurement. Also, it has been found that the dielectric constant of the liquid is a good indication of its solubility in the resin, and intermediate liquids are also possible based on a consideration of the dielectric constant. The dielectric constant of the preferred resin used in the SLA-250, CIBATOOL XB-5081, is about 4, and with this resin, it has been found that intermediate liquids having a dielectric constant of about 3 or less, or about 10 or more, are possible.

Regarding transparency to light, the intermediate liquid should be substantially transparent to light in the region of wavelength where the post-curing takes place. This is because during post-curing, a finished part will be immersed in the intermediate liquid, and the liquid must be substantially transparent to the UV light so it will reach the part for post-curing. Current resins have their peak curing activity near about 330 nm, and mercury lamps presently used for post-curing have their peak output near about 365 nm. Therefore, for the present commercial embodiment of the system, the intermediate liquid should be substantially transparent to light in the wavelength range of about 330 to about 390 nm. Other intermediate liquids are possible, however, since the wavelength of the light used for post-curing could change.

The transparency will also depend on the dimensions of the vat used. The SLA-500 is a recent commercial embodiment of a stereolithography apparatus (the SLA-250 is an earlier embodiment), and a key aspect of the SLA-500 is to build bigger parts than with the SLA-250. Accordingly, the vat used in the SLA-500 is approximately 20 inches in length and width, whereas the vat used in the SLA-250 is approximately 12 inches in length and width. For a liquid to be substantially transparent to UV light, at least about 80% of the UV light should penetrate to the middle of the vat. Therefore, for the SLA-250, at least about 80% of the light should penetrate about six inches into the liquid, whereas for the SLA-500, at least about 80% of the UV light should penetrate about 10 inches into the liquid. Both water-based salt solutions and fluorinated liquids meet this requirement.

The transparency also depends on how much resin dissolves in the liquid during part cleaning since the dissolved resin may strongly absorb light of the appropriate wavelengths, and interfere with the post-curing. Therefore, the transparency will depend on the solubility of the resin in the liquid, and account must be taken of the solubility in choosing a liquid.

Two examples of dense intermediate liquids which have been found to be acceptable for use with CIBATOOL XB-5081 are perfluorinated high-boiling liquids such as FLUORINET FC-40 (3M Corp.), and water-based salt solutions such as magnesium sulfate or sodium chloride in water. FLUORINERT FC-40 has a density of approximately 1.5 g/ml., a magnesium sulfate in water solution is possible having a density of at least about 1.2 g/ml., and a sodium chloride in water solution is possible having a density of about 1.2 g/ml. Additional examples of possible liquids are perfluorodimethylcyclohexane (PCR Inc.) and trichlorotrifluoroethane (a/k/a FREON TF—DuPont Corp.).

The foregoing examples are given by way of illustration only for use with CIBATOOL XB-5081, and are not intended as limiting the use of other intermediate liquids, especially with other resins. For example, any completely fluorinated liquid with a boiling point higher than the temperature that the liquid will be maintained in the vat (a/k/a the "use temperature") is acceptable. FLUORINERT FC-40 was suggested above only on the basis of cost and availability.

Other examples of aqueous solutions of salts are also possible. The addition of the salts acts to increase the density and decrease the resin solubility. Salts of cesium are attractive because of their high density and solubility in water. Salts of iodide or bromide may also be useful. Improvements in the aqueous solutions mentioned above are possible by increasing the salt concentration, thereby decreasing the tendency for mutual solubility between the liquid and the resin.

The advantage of using the perfluorinated liquids is that they have negligible solubility in the resin and low vapor pressure, and are substantially inert. The benefit of a liquid having a low vapor pressure is that the liquid will have a high boiling point, and will not easily evaporate or generate bubbles when the platform is dipped into the liquid throughout part building. If the intermediate liquid evaporates and generates bubbles, the bubbles could be introduced into the resin, and a distortion of the final part introduced.

A consideration in using the prefluorinated liquids is their high cost. Typical costs of these liquids at present compared with that of the resins and the water-based salt solutions are listed below:

perfluorinated liquids: $900/gallon
water-based salt solutions: $1/gallon
resin: $360/gallon On the other hand, the intermediate liquids (unlike the resins) are not consumed, and need only to be replaced rarely. Using a liquid resin alone in the vat may be more expensive even with the perflourinated liquids since the resin may only have a shelf-life of only about six months, and may have to be replaced at this point even if it is not consumed in building a part. For the SLA-500, for example, about 80 gallons of resin are required to fill the vat, and since only about one quart of resin is used to make a part, almost the entire contents of the vat may have to be replaced about every six months. This turnover of the consumed resin means that a larger inventory of resin may be required, with a corresponding larger up-front investment. In addition, because of the rapid pace of technological development of resins, the inventory may become obsolete by the time it is used.

These problems may be aggravated when many types of resin (which differ by certain characteristics such as color or conductivity) are used to build different layers of the part. In this instance, in the traditional approach of part building, where a volume of resin unsupported by an intermediate liquid is placed in a vat, a large inventory (on the order of about 80 gallons) of each type of resin used may be required. By floating a layer of each resin on a volume of an intermediate liquid, an inventory of only approximately 5-10 gallons (depending on the thickness of the resin layer) of each type of resin may be all that is required.

A consideration in the use of water-based salt solutions with CIBATOOL XB-5081 is a possible slight compromise in performance with these solutions compared with the perfluorinated liquids. In some instances, it has been found that the surface of a "green" part prepared through the use of a water-based salt solution may have a rougher surface texture, apparently due to the solubility of the solution in the resin, which manifests itself in the final part as a rougher surface texture. Density and transparency seem adequate, however, and do not appear to be diminished in any way. Also, any compromise in performance may not be present for other resin formulations, better matched for use with water-based salt solutions. In addition, the water-based salt solutions are inexpensive.

A second consideration is that all salts may not be possible for a particular resin since some salt solutions may not be dense enough for that resin. To support the resin layer, the intermediate liquid should be denser than the resin, and preferably at least about 5% more dense. For example, CIBATOOL XB-5081 has a density of about 1.14 g/ml, and an intermediate liquid which has a density of at least about 1.2 g/ml is preferred for supporting this resin. Examples of such liquids are a water-based solution of sodium chloride (NaCl) in water maintained at a temperature of about 20 to about 30 degrees C., with a concentration of sodium chloride in water of about 311 g/l; or a water-based solution of magnesium sulfate ($MgSO_4$) in water maintained at a temperature in about the above range, with a concentration of magnesium sulfate in water of about 229 g/l. Both of these liquids have densities of about 1.2 g/ml.

A consideration in choosing a salt is the rapidity with which the density of the solution can be increased by increasing the concentration of salt in the solution. For example, increasing the percentage by weight of salt in a cesium chloride solution from about 26% to about 40%, and then to about 64%, will increase the density of the resulting solution from about 1.24 g/ml to about 1.42 g/ml, and then to about 1.88 g/ml, at about 20 degrees C. A second example is that by increasing the percentage by weight of salt in a magnesium sulfate solution from about 15% to about 20%, and then to about 26%, will increase the density of the resultant solution from about 1.16 g/ml to about 1.22 g/ml, and then to about 1.308 g/ml, at about 20 degrees C. A third example is that by increasing the percentage by weight of salt in a sodium chloride solution from about 15% to about 20%, and then to about 26%, will increase the density of the resultant solution from about 1.11 g/ml to about 1.15 g/ml, and then to about 1.20 g/ml.

A second consideration in choosing a salt is how close the resultant solution is to its saturation point. If a solution near its saturation point cools slightly, some salt crystals may form, which could be introduced into the resin, and cause a distortion in the final part. In addition, a solution near the saturation point may not provide desired flexibility, because it may not be possible to significantly increase the density of the solution by adding more salt if this should ever be desired, for example, to support a denser resin.

For example, at about 20, about 25, and about 30 degrees C., a sodium chloride solution has a saturation point of about 364, about 365, and about 367 g/l, respectively. In this temperature range, a concentration of about 311 g/l of sodium chloride in water is required to achieve a density of about 1.2 g/ml. At this concentration level, the solution is about 85% saturated. If a density of about 1.23 g/ml is desired, however, a concentration of about 367 g/l sodium chloride in water will be required, with the result that at this concentration level the solution will be about 100% saturated. As a result, further increases in concentration may not be possible, and in addition, if this solution cools down, salt crystals may form.

Another example is a solution of magnesium sulfate in water. At about 20, about 25, and about 30 degrees C., a magnesium sulfate solution has a saturation point of about 356, about 380, and about 403 g/l, respectively. In this temperature range, a concentration of about 229 g/l of magnesium sulfate in water will be required to achieve a density of about 1.2 g/l. At this concentration level, the solution is only about 64% saturated. If a density of about 1.23 g/ml is desired, a concentration of about 273 g/l of magnesium sulfate in water will be required, and at this concentration level, the solution will only be about 77% saturated.

In some instances, it may be possible to increase the saturation point of a solution by increasing the temperature at which the liquid is maintained. In fact, a given rise in temperature may have a greater impact on the saturation point of some salts than with others. A sodium chloride solution, for example, has a saturation point of about 357 g/l at about 0 degrees C., and a saturation point of about 391 g/l at about 100 degrees C. A magnesium sulfide solution, on the other hand, has a saturation point of about 260 g/l at about 0 degrees C., and a saturation point of about 738 g/l at about 100 degrees C. A rise in temperature from about 20 to about 30 degrees C., will only increase the saturation point of a sodium chloride solution from about 364 to about 367 g/l, while the same temperature rise will increase the saturation point of a magnesium sulfate solution from about 356 to about 403 g/l.

In other instances, it may be possible to increase the density by increasing the molecular weight of the salt used, or alternatively, by increasing the atomic weight of the metal in the salt. Since a mole of each salt will add roughly the same volume to a solution, the greater the molecular weight, the greater the impact on density. For several salts, the molecular weight is provided below:

| Salt | Molecular weight (g/mole) |
| --- | --- |
| Cesium Sulfate | 361 |
| Magnesium Sulfate | 120 |
| Sodium Chloride | 58 |

For these salts, the atomic weight of the metal used to make up the salt is as follows:

| Metal | Atomic Weight (g/mole) |
| --- | --- |
| Cesium | 133 |
| Magnesium | 24 |
| Sodium | 23 |

Consideration of the above tables suggests that a particular density solution can be achieved with a solution having a relatively low concentration of cesium sulfate (compared to its saturation point), a higher concentration of magnesium sulfate (compared to its saturation point), and an even higher concentration of sodium chloride (compared to its saturation point). A consideration of the actual data confirms this. The saturation points of solutions of cesium sulfate, magnesium sulfate, and sodium chloride are about 1780 g/l, about 356 g/l, and about 364 g/l, respectively, at about 20 degrees C. At about this temperature, the required concentrations (compared to their saturation points) of these salts to achieve a solution density of about 1.2 g/ml is about 14% for cesium sulfate, about 64% for magnesium sulfate, and about 85% for sodium chloride.

A third consideration in choosing a salt is whether the salt is photoreactive. Iodide salt, for example, may be partially photoreactive. A photoreactive salt may absorb UV light, and interfere with post-curing.

A fourth consideration in choosing a salt is the material used to construct the vat. For the SLA-250, for example, the vat is made out of aluminum, and as is known, chloride is corrosive to aluminum.

A fifth consideration in choosing a salt is the risk of introducing contaminants in the resin, which may be a serious problem in the application of stereolithography to investment casting (a/k/a the lost plastic process). According to this process, a finished part is dipped into a casting material, the plastic is burned off, and then metal is poured into the space vacated by the plastic. If salt has contaminated the resin used to make the part, the burning off of the plastic may leave a salt ash afterwards, which could lead to imperfections in the metal part. In general, any contamination of the resin by more than about 1% by the salt may leave an unacceptable ash, unless a salt with an organic cation such as salts of alkyl ammonium or salts of just ammonium are used, since they may completely burn out with the resin. Examples of such salts are ammonium sulfate or ammonium nitrate.

The above examples are provided for illustrative purposes, and are not intended to be limiting. Based on the considerations set forth above, other salts and other intermediate liquids are possible, and, one of ordinary skill would be able to select an appropriate salt or intermediate liquid for a particular resin and set of operating parameters based on these considerations.

A second embodiment of the subject invention is illustrated in FIGS. 4-5 in which like components are identified with like reference numerals. An important object of this embodiment is the integration of part cleaning and post-curing into part building, and to facilitate this integration, a dual chamber resin vat is provided, a top view of which is illustrated in FIG. 4a.

Figure 4A:
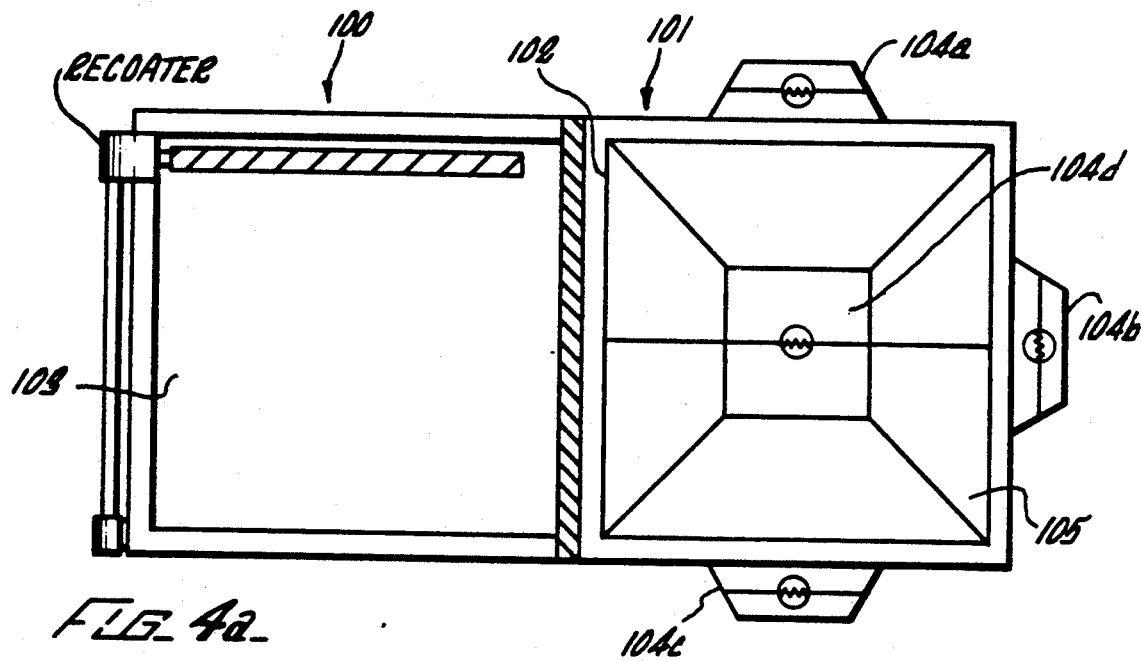
FIG. 4a illustrates a top view of a dual chamber embodiment of the subject invention.

As illustrated in FIG. 4a, the dual chamber vat comprises a first chamber 100, and a second chamber 101 separated from the first chamber by partition 102. Resin layer 103 floating on the intermediate liquid (not identified with a reference numeral) only is placed in the first chamber, while the intermediate liquid (not identified with a reference numeral) only is placed in the second chamber. In addition, the second chamber is provided with a plurality of spaced UV flood lamps or the like, identified with reference numerals 104a, 104b, 104c, respectively, situated on the walls (side and top) of the chamber for flooding the interior of the chamber with UV light during post-curing. The second chamber is covered, as shown, with removable opaque cover 105, which cover also has a UV flood light, identified with reference numeral 104d, situated on it for flooding the interior of the second chamber with UV light during post-curing.

The dual chamber vat integrates part building, part cleaning, and post-curing into one apparatus. A side view of the dual chamber vat during part building is illustrated in FIG. 4b.

As illustrated, partition 102 does not extend all the way to the bottom of the vat. Instead, extending to the bottom of the vat is hinged shutter 106 which, as shown, is placed in the open position during part building. Also, as illustrated, the second chamber is provided with a volume of the intermediate liquid, while the first chamber is provided with a resin layer 103 floating on a volume of the intermediate liquid. The resin supported by the liquid forms a resin/liquid interface, and with the shutter in the open position, the resin/liquid interface should be kept above the bottom 102a of the partition so that the resin will not flow over to the second chamber. This can be accomplished by placing a sufficient amount of intermediate liquid in the two chambers so that the resin/liquid interface will be above the bottom 102a of the partition.

Figure 4B:
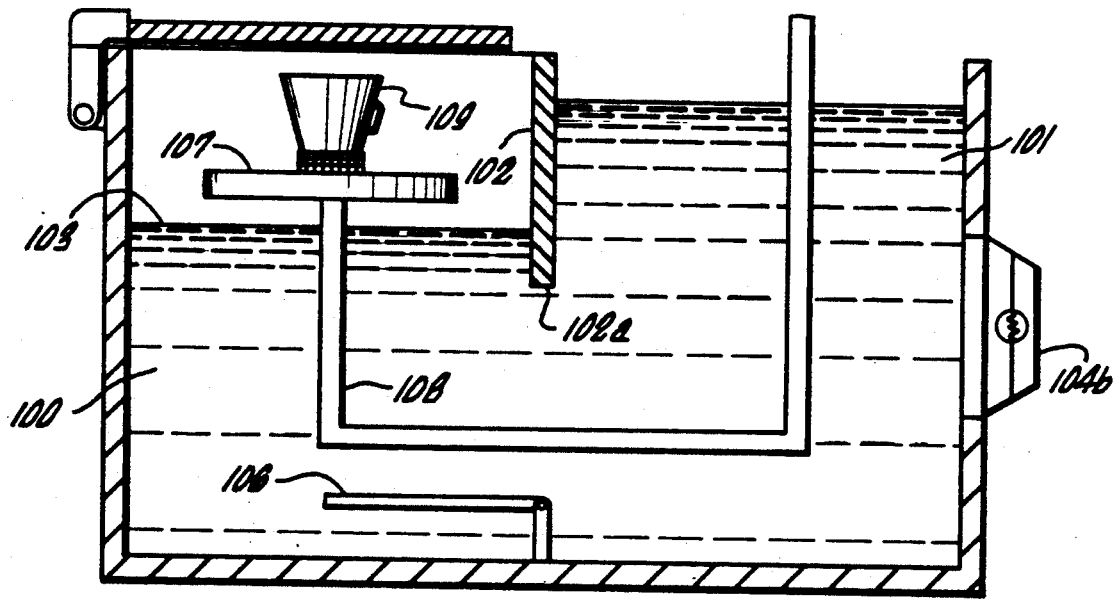
FIG. 4b illustrates a side view of the dual chamber embodiment of FIG. 4a during part-building.

Also shown in FIG. 4b is travelling platform 107 situated on guide rails 108 for guiding the platform from the first to the second chambers with the shutter placed in the open position after part building and part cleaning are completed. FIGS. 5a-5e illustrate the travelling platform and associated guide rails for guiding the platform between the two chambers.

Figure 5A:
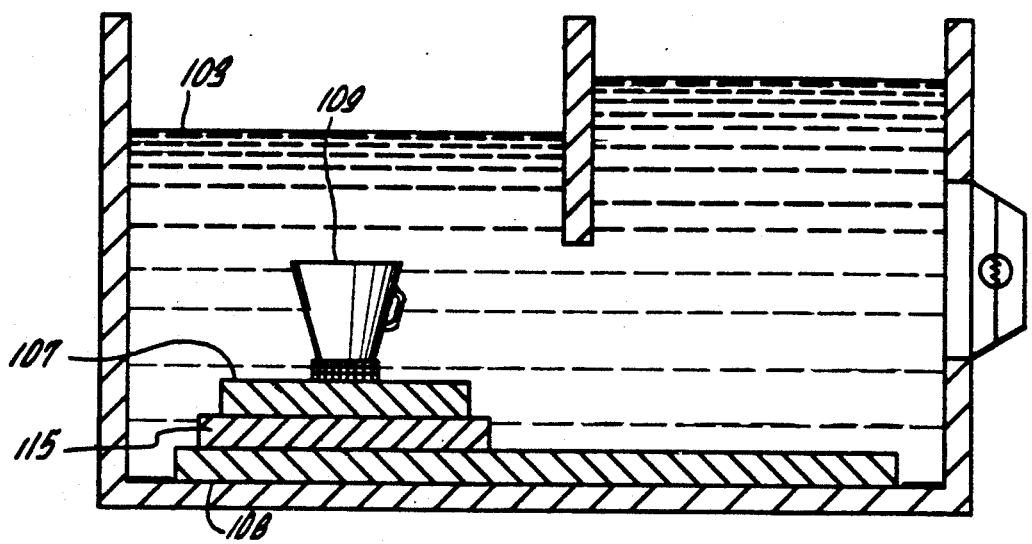
FIG. 5a illustrates a side view of the travelling platform in the dual chamber vat embodiment of FIGS. 4a–4d.
Figure 5B:
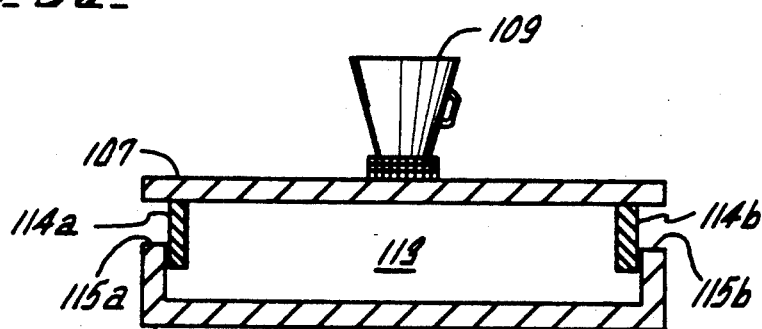

Turning now to FIG. 5a, which provides an illustration of a side view of a dual chamber vat, part 109 is shown situated on travelling platform 107 which is placed on top of carriage 115. The platform and carriage move laterally between the chambers in the vat by means of guide rails 108. FIG. 5b shows a frontal view of the arrangement of FIG. 5a. Platform 107 moves vertically by means of a Z-stage elevator (not shown), which has two arms, 114a and 114b, which are placed underneath the platform as shown to support it as the Z-stage elevator moves vertically along elevator rails (not shown). When it is desired to have the platform move into the second chamber, the Z-stage elevator lowers itself sufficiently so that the platform rests on ridges 115a and 115b of carriage 115. Between the ridges and below the platform is hollow area 113 into which the arms of the Z-stage elevator fit when the elevator has lowered the platform onto the carriage. After this has been accomplished, the platform and carriage are caused to move into the next chamber, as illustrated in FIG. 5d, at which point post-curing begins after the hinged shutter has been closed. When post-curing has been completed, the platform and carriage can be moved back into the first chamber, as illustrated in FIG. 5a, and if the arms of the Z-stage elevator have not been moved, they will not interfere with the movement of the carriage back into its original position, and when the carriage has been moved back to this position the Z-stage elevator arms will continue to fit into the hollow area between ridges 115a and 115b of the carriage, and below the platform. Then, the Z-stage elevator can raise the platform by means of the arms so that the post-cured part can be removed, and so that another part can be built.

Figure 5C:
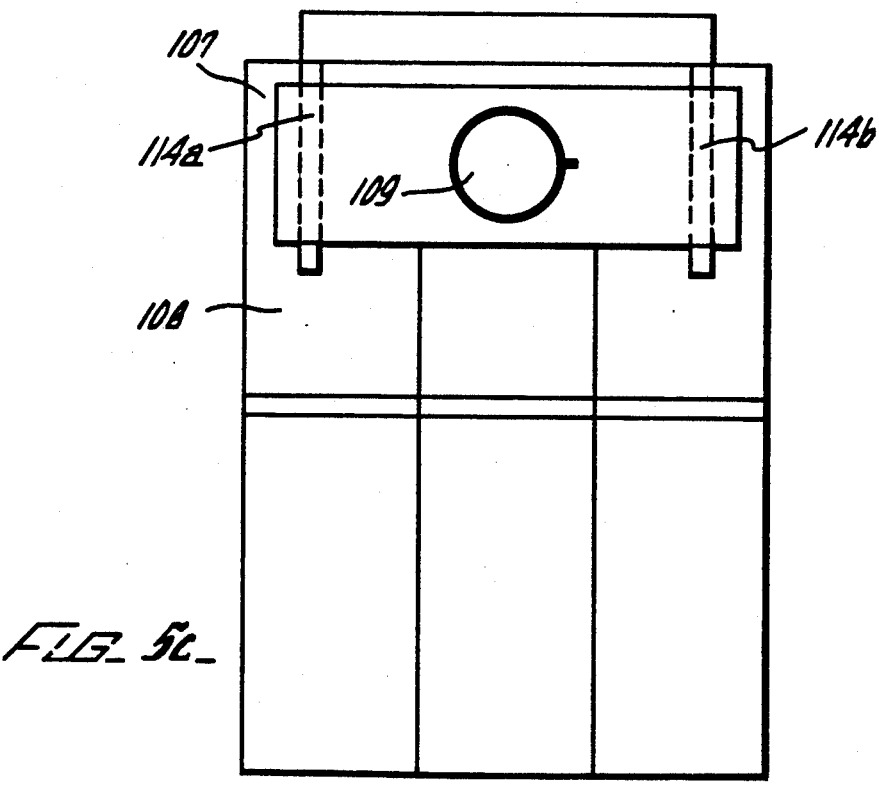
Figure 5D:
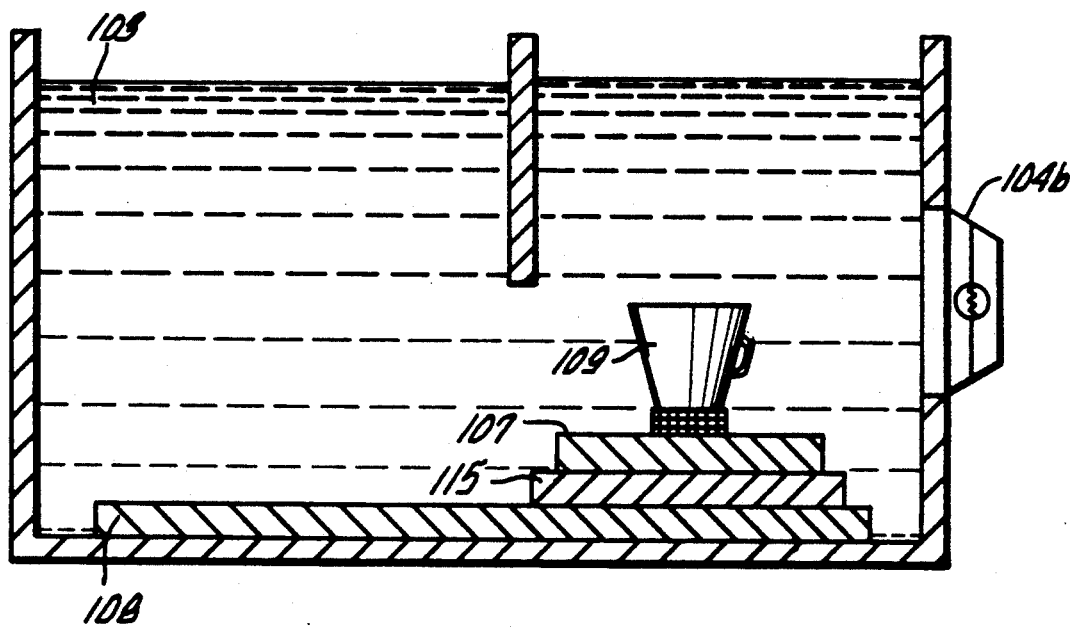
FIG. 5d illustrates a side view of the travelling platform of FIG. 5a during post-curing.

A top view of the arrangement of FIGS. 5a and 5b is shown in FIG. 5c, which shows Z-stage elevator arms 114a and 114b supporting platform 107 (the portions of the arms underneath the platform are shown with dashed lines). A control computer (not shown) may also be provided for controlling the movement of the platform between the chambers, and for opening and closing the hinged shutter.

A perspective view of the arrangement of FIGS. 5a and 5b is shown in FIG. 5e, which shows elevator rails 116, which are used to guide platform 107 in a vertical direction. Also shown is carriage 115 for supporting platform 107 after the platform has been lowered sufficiently by the Z-stage elevator, and linear rails 108 for guiding the carriage/platform in a horizontal direction. Also illustrated is hinged shutter 106, which can be opened to allow the carriage/platform to move into the second chamber, or closed to isolate the resin layer in the first chamber from UV light originating from the second chamber during post-curing.

Turning back to FIG. 4b, during part building, the platform is progressively lowered through the resin/liquid interface and into the liquid itself as the build-up of the part, identified with reference numeral 109 in FIG. 4b, continues.

Note that during part building, as the part building proceeds, there is a danger, particularly with thin resin layers, that the close proximity of the resin/liquid interface to the upper surface of the resin will affect part building. It has been found that this has little consequence on part building if the resin layer is about an inch or more in thickness. If the resin layer is less than this, part building may be affected more since the movement of the completed portions of the part as they pass through the interface may cause a temporary disruption at the interface, which disruption can extend approximately a quarter inch on either side of the interface both into the resin layer and into the liquid. A resin layer of about an inch or more will reduce or even eliminate the impact this disruption may have on the surface of the resin layer, and hence on part building itself.

Figure 4C:
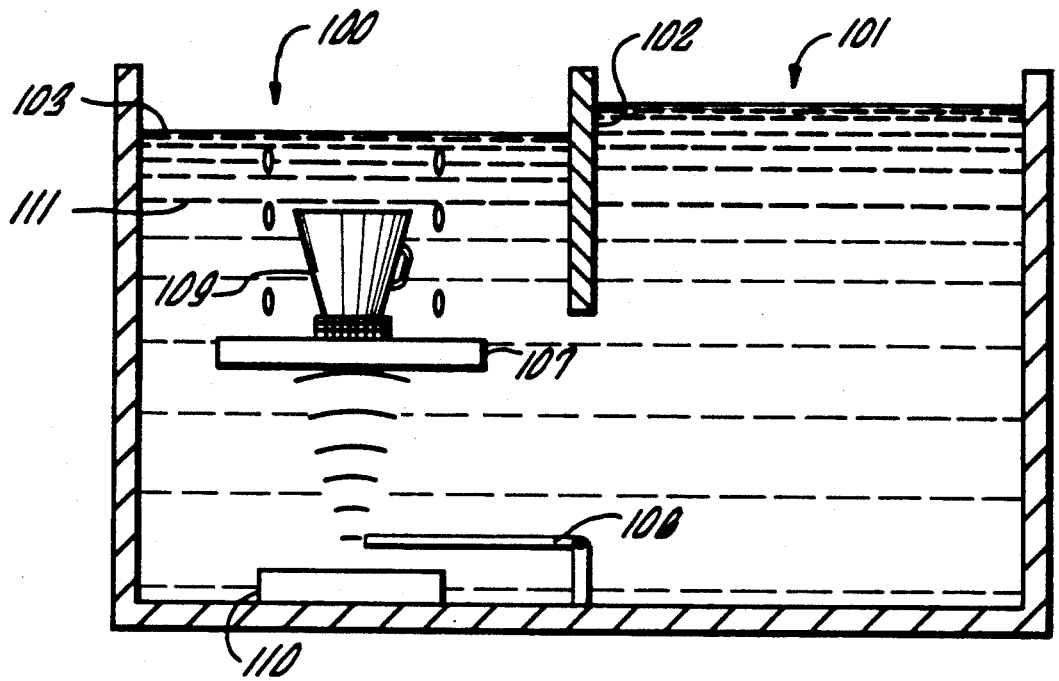
FIG. 4c illustrates a side view of the dual chamber embodiment of FIG. 4a during part cleaning.

As the completed portions of the part are lowered beneath the resin/liquid interface, part cleaning can begin. A side view of the dual chamber vat during part cleaning is illustrated in FIG. 4c.

As the built layers of the part are lowered beneath the interface, excess resin adhering to the built portions is stripped away. It has been found that ultrasonic agitation greatly accelerates this process, for which purpose, ultrasonic transducer ;10 is provided in the first chamber of the vat as illustrated in FIG. 4c. As illustrated, the excess resin, identified with reference numeral 111 in FIG. 4c, is shaken off into the intermediate liquid, which causes the resin, being of lighter density than the liquid, to float to the surface and recombine with the resin layer. When part cleaning has been completed, the entire part will be immersed in the intermediate liquid as illustrated in FIG. 4c. A major benefit of part cleaning as described above is that the need to dispose of excess resin and intermixed solvent, and the need to clean the solvent through distillation, followed by reclamation, which is attendant with other approaches, is eliminated. In addition, compared with other approaches, it may be easier to clean hard-to-reach portions of a part.

Compared to the embodiments of FIGS. 3a and 3b, it may not be possible to use an intermediate liquid which is also a cleaning solvent. This is because the action of the solvent could interfere with part building and post-curing since the solvent could cause the part to dissolve while the part is immersed, and in addition, dissolved resin in the liquid could absorb UV light, and therefore interfere with post-curing. This is in spite of the fact that the composition of a typical solvent, i.e., a mixture of FREON TF and methanol, is similar to the composition of an illustrative intermediate liquid described earlier, i.e., FREON TF alone. As a result, for this embodiment, the use of FREON TF is a preferred intermediate liquid compared with FREON TMS even though FREON TF alone may be less efficient by itself as a solvent compared with FREON TMS. However, any diminished cleaning power can be taken up by the action of the ultrasonic transducer. Also, as described in more detail earlier with respect to the embodiments of FIGS. 3a and 3b, other approaches for enhancing part cleaning are possible, such as physical agitation, heating up the vat, or vapor or spray degreasing. In addition, water-based salt solutions may be more effective than FREON TF for part cleaning.

Turning back to FIG. 4c, after the excess resin has been substantially cleaned off, with the hinged shutter between the chambers in the open position, the platform on which the built part is placed is moved along guide rails 108 into the second chamber. At this point, post-curing begins after the hinged shutter is closed.

Figure 4D:
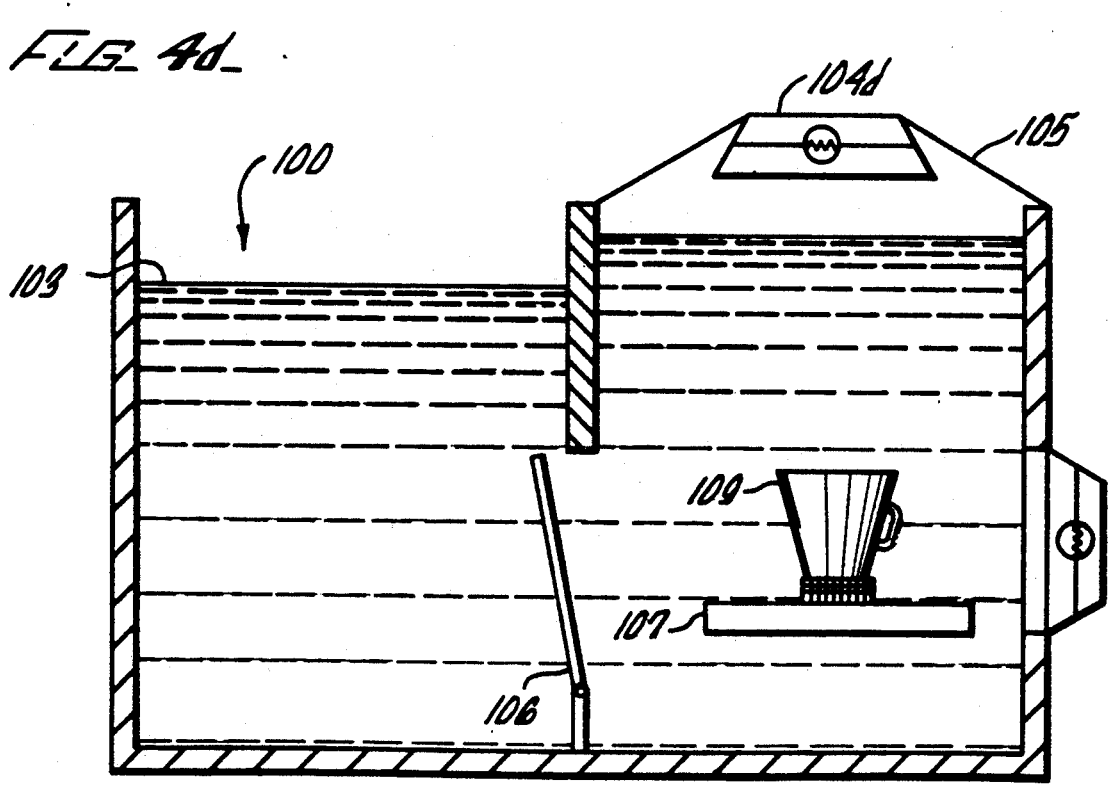
FIG. 4d illustrates a side view of the dual chamber embodiment of FIG. 4a during post-curing.

A side view of the dual chamber vat during post-curing is illustrated in FIG. 4d. As illustrated, after the platform is moved along the guide rails (not shown) into the second chamber, shutter 106 is closed to substantially block UV light from the UV flood lamps, 104a, 104b, 104c, 104d, respectively, from entering the first chamber where the resin layer is situated. If this light were allowed to substantially enter the first chamber, it could partially polymerize the resin layer. After the shutter has been closed, post-curing can begin while the part is immersed in the liquid as described in more detail in U.S. patent application Ser. No. 183,016, and its CIP Serial No. 268,429. As described in those applications, post-curing has been found very advantageous in stereolithography, yielding much higher accuracy parts, particularly when the part is immersed in water or water-based solutions. Post-curing while the part is immersed in a liquid is beneficial since the liquid carries away the heat of reaction generated in the post-curing, which heat could otherwise cause distortion of the part, and in addition, removes oxygen from the surface, which could otherwise inhibit post-curing, and leave a tacky surface. Post-curing the part while it is immersed in a perfluorinated liquid will also be advantageous, since the thermal conductivity, heat diffusion characteristics, and oxygen solubility of these liquids are comparable to like characteristics for water-based solutions.

The intermediate liquid should be substantially transparent to UV light to provide for post-curing. As explained in more detail above, this requirement depends on the dimensions of the vat used. The liquid should be such that at least about 80% of the UV light penetrates to about the middle of the vat. For an SLA-250 having about a 12 in. vat, the critical penetration is about 6 inches, while for an SLA-500 having about a 20 in. vat, the critical penetration is about 10 inches.

When post-curing has been completed, the part can be removed for manual finishing. Optionally, certain part finishing steps such as filling surface discontinuities with liquid resin followed by flash setting of the surface as described in more detail in U.S. patent application Ser. No. 183,012, and its CIP, Serial No. 268,428, can be integratably performed in the second chamber using the UV lamps.

Figure 6A:
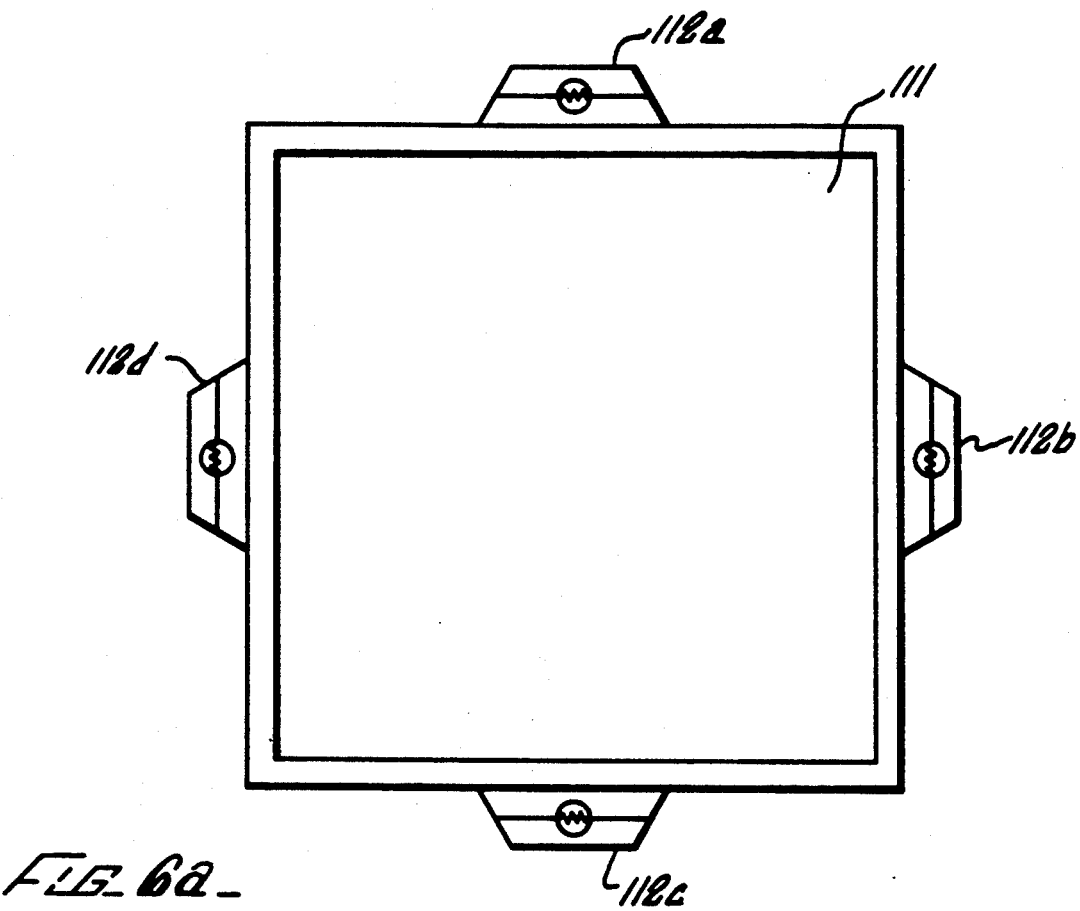
FIG. 6a illustrates a top view of a single chamber vat embodiment of the subject invention.
Figure 6B:
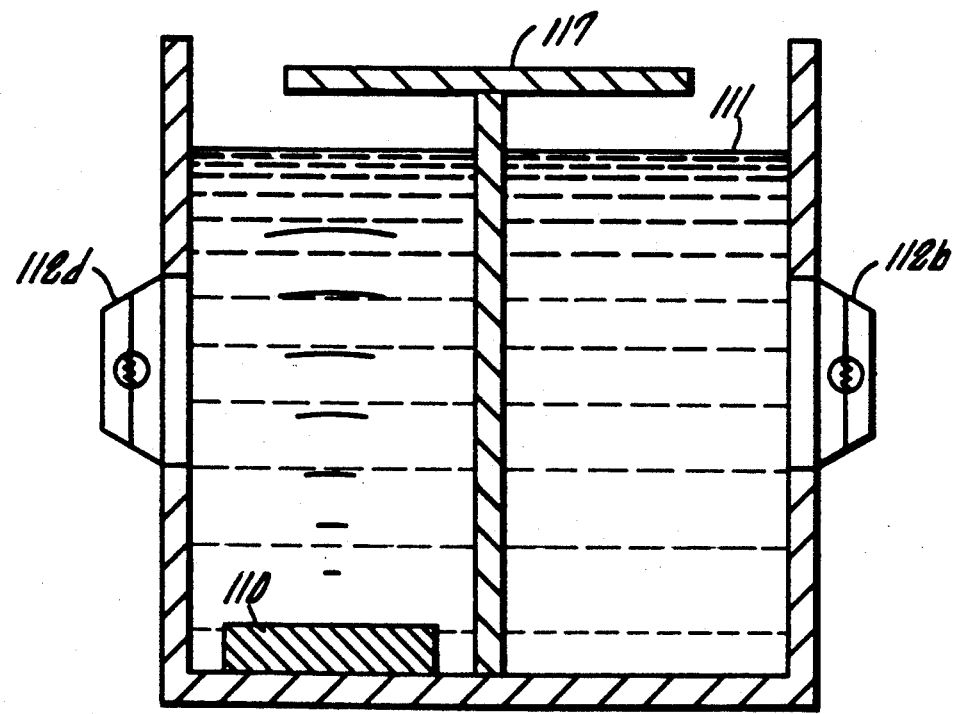

Other embodiments of the subject invention are possible. FIGS. 6a and 6b illustrate a single chamber vat into which is placed resin layer 111 floating on a volume of intermediate liquid. FIG. 6a shows a top view where the vat is equipped with a plurability of spaced, UV flood lamps 112a, 112b, 112c, and 112d. FIG. 6b shows a side view of the vat, which is equipped with platform 117 situated in the same chamber as UV flood lamps 112 and ultrasonic transducer 110. Part building and part cleaning take place as described earlier with the two chamber vat embodiment. However, before post-curing can take place, the resin layer should be pumped off or scooped away by a pump or scoop (not shown), or alternatively, a hinged shutter (not shown) can be added, which shutter is situated so that after the platform/part has been moved to a predetermined location for post-curing, the hinged shutter can be closed throughout post-curing to substantially block UV light emitted by the UV flood lamps from the resin layer.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit or scope of applicant's general inventive concept, and the invention is not intended, nor should it be construed, as limited to the examples and embodiments illustrated and described, except as by the appended claims.

What is claimed is:

1. An improved stereolithography apparatus of the type for building a part at a surface of a volume of material capable of selective physical transformation upon exposure to prescribed synergistic stimulation including means for exposing successive cross-sectional patterns of said part on a selected surface of said material capable of selective physical transformation and successively forming a coating of said material on cross-sections of a determined thickness to form a laminate composite of said part, the improvement comprising means for building the part at the surface of a layer of said material capable of selective physical transformation supported on a volume of a dense, immiscible, intermediate liquid, at least partially transparent to said synergistic stimulation and means for immersing at least a portion of the part into the intermediate liquid and means for integratably performing additional stereolithographic processing on at least a portion of the part while immersed in the intermediate liquid.

2. The apparatus of claim 1 wherein the additional stereolithographic processing means comprises at least one source of synergistic stimulation for subjecting the immersed portion of the built part to said synergistic stimulation, and isolating means for substantially isolating the layer of material capable of selective physical transformation from the synergistic stimulation.

3. The apparatus of claim 1 wherein the additional stereolithographic processing means comprises at least one ultrasonic transducers which ultrasonically agitate the immersed portion of the part.

4. The apparatus of claim 2 wherein the isolating means comprises a dual chamber vat having a first chamber containing the layer of material capable of selective physical transformation supported by the volume of the intermediate liquid and a second chamber containing a second volume of the intermediate liquid, a movable platform on which the part is built for moving the part along a predetermined path from the first to the second chambers, and a shutter placed along the predetermined path between the first and second chambers having an open and a closed position, wherein the part is moved from the first chamber to the second chamber by means of the platform when the shutter is open, wherein the second chamber has a periphery and an interior, and sources of synergistic stimulation are spaced around the periphery, wherein the shutter is closed after the part is moved to the second chamber, and wherein said synergistic stimulation thereafter impinges upon the part.

5. The apparatus of claim 2 wherein the isolating means is a pump for pumping off the material capable of selective physical transformation before post-curing.

6. The apparatus of claim 2 wherein the isolating means is a scoop for scooping off the material capable of selective physical transformation before post-curing.

7. The apparatus of claim 2 wherein the isolating means comprises a single chamber vat containing the layer of material capable of selective physical transformation supported by the volume of the intermediate liquid, a movable platform on which the part is built for moving the built part to a predetermined location, a hinged shutter having an open and a closed position, wherein the built part is moved by means of the platform to the predetermined location when the hinged shutter is open, wherein the vat has a periphery around which sources of synergistic stimulation are spaced wherein the shutter is closed after the built part is moved to the predetermined location, and wherein synergistic stimulation thereafter impinges upon the part.

8. An improved stereolithography apparatus according to claim 1 wherein the means for integratably performing additional stereolithographic processing further comprises means for integrating part building, cleaning and post-curing, including means for building the part by directing the synergistic stimulation to impinge upon the surface of a layer of the material capable of selective physical transformation floating on a volume of an intermediate liquid having a density which is at least about 5% greater than a density of the material capable of selective physical transformation floating on a volume of an intermediate liquid having a density which is at least about 5% greater than a density of the material capable of selective physical transformation, a solubility which is in a range from less than about 7 $(cal./cm^3)^{\frac{1}{2}}$ to at least about 20 $(cal./cm^3)^{\frac{1}{2}}$, and wherein the intermediate liquid has a surface, and at least about 80% of synergistic stimulation having a wavelength in a range of between about 330 to about 390 nm. penetrates to at least about six inches into the intermediate liquid beyond the surface;

means for at least partially immersing the part into the intermediate liquid to remove excess material; and means for subjecting at least some of the immersed portion to sufficient synergistic stimulation to effect post curing.

9. The apparatus of claim 8 wherein the intermediate liquid has a density of at least about 1.2 g/ml.

10. The apparatus of claim 8 wherein the intermediate liquid is maintained at a predetermined temperature during part building, and the intermediate liquid is a perfluorinated liquid having a boiling point approximately greater than this temperature.

11. The apparatus of claim 8 wherein the intermediate liquid is a water-based salt solution.

12. An improved method of the type for building a part on a surface of a volume of material capable of selective physical transformation upon exposure to synergistic stimulation by exposing to synergistic stimulation successive cross-sectional patterns of said part on a selected surface of said material capable of selective physical transformation to form a laminate composite of said part, the improvement comprising the steps of building the part on the surface of a layer of the material capable of selective physical transformation supported by a volume of a dense, immiscible, intermediate liquid, at least partially transparent to said synergistic stimulation and then integratably performing additional stereolithographic processing on at least a portion of the part while it is immersed in the intermediate liquid.

13. The method of claim 12 wherein the additional stereolithographic processing comprises subjecting the immersed portion of the part to synergistic stimulation while substantially isolating the layer of the material capable of selective physical transformation from the synergistic stimulation.

14. The method of claim 12 wherein the additional stereolithographic processing comprises subjecting the immersed portion of the part to ultrasonic agitation.

15. A method according to claim 12 further comprising the step of building the part by directing synergistic stimulation to impinge upon a surface of a layer of the material and integrating building, cleaning and post-curing functions by supporting said material on a volume of an intermediate liquid having a density which is at least about 5% greater than a density of the working material, having a solubility which is in a range from less than about 7 $(cal./cm^3)^{\frac{1}{2}}$, to at least about 20 $(cal./cm^3)^{\frac{1}{2}}$, and wherein the intermediate liquid has a surface, and wherein at least about 80% of synergistic stimulation having a wavelength in a range of between about 330-390 nm, penetrates to at least about six inches into the liquid beyond the surface;

at least partially immersing the part into the intermediate liquid to remove excess material; and subjecting at least some of the immersed portion to sufficient synergistic stimulation to effect post-curing.

16. The method of claim 15 wherein the intermediate liquid is maintained at a predetermined temperature during part building, and the intermediate liquid is a perfluorinated liquid having a boiling point approximately greater than this temperature.

17. The method of claim 15 wherein the intermediate liquid is a water-based salt solution.

18. An improved stereolithographic apparatus, for generating a part by forming successive cross-sectional patterns of the part at a selected surface of a material capable of selective physical transformation upon exposure to prescribed synergistic stimulation, including means for forming a coating on said cross-sections as they are formed with said material and for building up said part in step-wise fashion and thereafter cleaning and post-curing the part in separate apparatus, the improvement comprising means for integrating part cleaning and post-curing including means for immersing at least a portion of the part in a volume of liquid stripping medium to substantially remove the excess material from the portion prior to exposing at least some of the immersed portion to synergistic stimulation, means for exposing at least some of said immersed portion to synergistic stimulation while surrounded by the liquid stripping medium.

19. The apparatus of claim 18 comprising means for subjecting the immersed portion to ultrasonic agitation to assist in substantially removing the excess material from the portion.

20. The apparatus of claim 18 wherein the liquid stripping medium is a liquid solvent and wherein the portion of the part is immersed in the liquid solvent in a range of from less than about 10 minutes to less than about two minutes.

21. An improved stereolithographic apparatus, for generating a part by forming successive cross-sectional patterns of said part at a selected surface of a material capable of selective physical transformation upon exposure to prescribed synergistic stimulation including means for forming a coating on said cross-sections with said material as they are formed and for building up said part in step-wise fashion, and thereafter cleaning and post-curing the part in separate apparatus the improvement comprising means for integrating part cleaning and post-curing including means for immersing at least a portion of the part in solvent vapor of a vapor degreaser to substantially remove excess material from the portion and means for post-curing, including means for exposing at least some of said immersed portion to synergistic stimulation while surrounded by the solvent vapor.

22. An improved stereolithographic apparatus for producing a part by forming successive cross-sectional patterns of said part at a selected surface of a material capable of selective physical transformation upon exposure to prescribed synergistic stimulation including means for forming coatings of said material on said cross-sections as they are formed and for building up said part in a step-wise fashion, the improvement comprising means for integrating part cleaning and post-curing in the same apparatus with part building, including means for building the part, means for immersing at least a portion of the part in a volume of liquid stripping medium, and means for supplying synergistic stimulation to at least some of the immersed portion of the part to effect post-curing after substantially removing the excess material from the portion.

23. The apparatus of claim 23 including additional stereolithographic processing means comprising at least one physical agitation means for agitating the liquid stripping medium.

24. The apparatus of claim 23 wherein the liquid stripping medium medium is a solvent such as isopropanol, ethanol, propylene carbonate, water based cleaners.

25. An improved stereolithographic method, for forming a part from a material capable of selective physical transformation upon exposure to prescribed synergistic stimulation including forming successive cross-sectional patterns of the part on a selected surface of the material, forming a coating of said material on said cross-sections as they are formed and building up the part in a step-wise fashion, the improvement comprising the steps of integrating part cleaning and post-curing including immersing at least a portion of the part in a volume of solvent vapor of a vapor degreaser, and subjecting the immersed portion to synergistic stimulation after substantially removing excess material from the portion.

26. An improved stereolithographic method for forming a part from a material capable of selective physical transformation upon exposure to prescribed synergistic stimulation including forming successive cross-sectional patterns of the part on a selected surface of the material, forming a coating of said material on said cross-sections as they are formed and building up the part in a step-wise fashion, the improvement comprising the steps of integratably performing part cleaning and post-curing in the same apparatus with part building including the step of forming the part, the step of immersing at least a portion of the part in a volume of liquid stripping medium, and the step of exposing at least some of the immersed portion of the part to synergistic stimulation to effect post-curing after substantially removing excess material from the portion.

27. An improved stereolithographic method of the type for forming a part from a working material capable of physical transformation upon exposure to synergistic stimulation by using a source of synergistic stimulation to form successive cross-sectional patterns of the part on a selected surface of the working material, forming a coating of said material on the cross-sections as they are formed and building up the part in a step-wise fashion and thereafter cleaning and post-curing the part in separate apparatus, the improvement comprising integratably performing the steps of immersing at least a portion of the part in a volume of a liquid stripping medium to substantially remove excess material from the portion and subjecting the immersed portion to synergistic stimulation.

28. The method of claim 16 wherein the intermediate liquid is a perfluorinated liquid.

29. An improved stereolithographic apparatus for producing a part by forming successive cross-sectional patterns of said part at a selected surface of a material capable of selective physical transformation upon exposure to prescribed synergistic stimulation including means for forming a coating of said material on said cross-sections as they are formed and for building up said part in a step-wise fashion, the improvement comprising means for building the part cross-section by cross-section and means integral with the means for building for immersing at least a portion of the part in a liquid stripping medium to substantially remove excess material from the portion.

30. An improved stereolithographic apparatus for producing a part by forming successive cross-sectional patterns of said part at a selective surface of a material capable of selective physical transformation upon exposure to prescribed synergistic stimulation including means for forming a coating of said material on said cross-sections as they are formed and for building up said part in a step-wise fashion, the improvement comprising means for building the part cross-section by cross-section and means integral with the means for building for immersing at least a portion of the part in solvent vapor of a vapor degreaser to substantially remove excess material from the portion.

31. The apparatus of claim 29 wherein the liquid stripping medium is a solvent.

32. The apparatus of claim 29 wherein the liquid stripping medium is a non-solvent.

33. The apparatus of claim 29, including means for agitating the excess material while the portion is immersed in the liquid stripping medium.

34. The method of claim 27, including the step of providing a solvent as the liquid stripping medium.

35. The method of claim 27, including the step of providing a non-solvent as the liquid stripping medium.

36. The method of claim 27, including the step of agitating the excess material while the portion is immersed in the liquid stripping medium.

37. The method of claim 26, including the step of providing a solvent as the liquid stripping medium.

38. The method of claim 26, including the step of providing a non-solvent as the liquid stripping medium.

39. The method of claim 27, including the step of agitating the excess material while the portion is immersed int he liquid stripping medium.

* * * * *

UNITED STATES PATENT AND TRADEMARK OFFICE
CERTIFICATE OF CORRECTION

PATENT NO. : 5,143,663
DATED : September 1, 1992
INVENTOR(S) : Leyden et al.

It is certified that error appears in the above-identified patent and that said Letters Patent is hereby corrected as shown below:

Column 27,
Line 27, should read "stripping medium is a medium such as isopropa";

Signed and Sealed this

Twentieth Day of November, 2001

Attest:

NICHOLAS P. GODICI
Attesting Officer  Acting Director of the United States Patent and Trademark Office